United States Patent
Hatakeyama et al.

(10) Patent No.: US 9,148,705 B2
(45) Date of Patent: Sep. 29, 2015

(54) WIRELESS TERMINAL, WIRELESS COMMUNICATION SYSTEM, AND WIRELESS COMMUNICATION CONTROL DEVICE

(71) Applicant: Panasonic Intellectual Property Management Co., Ltd., Osaka-shi, Osaka (JP)

(72) Inventors: Takeshi Hatakeyama, Osaka (JP); Masaaki Higashida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 128 days.

(21) Appl. No.: 14/162,752

(22) Filed: Jan. 24, 2014

(65) Prior Publication Data
US 2014/0208370 A1  Jul. 24, 2014

(30) Foreign Application Priority Data
Jan. 24, 2013  (JP) .................................. 2013-011468

(51) Int. Cl.
| | |
|---|---|
| H04B 3/36 | (2006.01) |
| H04N 21/61 | (2011.01) |
| H04N 21/214 | (2011.01) |
| H04N 21/222 | (2011.01) |
| H04N 21/258 | (2011.01) |
| H04N 21/4363 | (2011.01) |
| B60N 2/00 | (2006.01) |
| B60N 2/02 | (2006.01) |

(52) U.S. Cl.
CPC ........... *H04N 21/61* (2013.01); *H04N 21/2146* (2013.01); *H04N 21/2223* (2013.01); *H04N 21/25841* (2013.01); *H04N 21/43637* (2013.01); *B60N 2/002* (2013.01); *B60N 2002/0272* (2013.01)

(58) Field of Classification Search
CPC .......... B60N 2/002; B60N 2002/0272; B60N 2002/0268; B60N 2/4876
USPC ............... 455/431, 7, 41.1, 41.2, 41.3, 422.1, 455/403, 412.1, 412.2, 455, 550.1, 500, 455/517, 507, 508, 426.1, 426.2, 455/414.1–414.4, 569.1, 569.2, 575.9, 90.3, 455/90.2, 90.1, 74, 73; 370/310, 328, 329, 370/338, 343
See application file for complete search history.

(56) References Cited

U.S. PATENT DOCUMENTS

| | | | |
|---|---|---|---|
| 7,483,696 B1 * | 1/2009 | Mitchell | 455/431 |
| 7,620,364 B2 | 11/2009 | Higashida et al. | |
| 2007/0213009 A1 | 9/2007 | Higashida et al. | |
| 2009/0052386 A1 * | 2/2009 | Higashida | 370/329 |
| 2012/0040665 A1 * | 2/2012 | Liu et al. | 455/426.1 |

FOREIGN PATENT DOCUMENTS

JP  2007-243884 A  9/2007

* cited by examiner

*Primary Examiner* — Keith Ferguson
(74) *Attorney, Agent, or Firm* — Shinjyu Global IP

(57) ABSTRACT

A wireless terminal communicates with a wireless communication apparatus including one or more wireless access points, and is used in a facility including a plurality of seats. The wireless terminal includes a seat position identifying unit, a distance determination unit, and a processing setting unit. The seat position identifying unit identifies a seat position of a user of the wireless terminal. The distance determination unit determines a distance from the identified position to the one or more wireless access points. The processing setting unit sets the processing associated with communication based on the determined distance.

20 Claims, 14 Drawing Sheets

| wireless AP / seat position | AP(1) | AP(2) | AP(3) | AP(4) | AP(5) |
|---|---|---|---|---|---|
| A1 | 7m | 2m | 10m | 15m | 11m |
| B15 | 10m | 5m | 15m | 5m | 2m |
| C12 | 13m | 7m | 3m | 11m | 4m |
| D4 | 3m | 5m | 10m | 15m | 20m |
| G7 | 8m | 10m | 4m | 2m | 5m |

FIG. 7

| wireless AP / seat position | AP(1) | AP(2) | AP(3) | AP(4) | AP(5) |
|---|---|---|---|---|---|
| A1 | obstacle present | obstacle present | no obstacle | no obstacle | obstacle present |
| B15 | no obstacle | obstacle present | no obstacle | no obstacle | no obstacle |
| C12 | no obstacle | no obstacle | obstacle present | obstacle present | no obstacle |
| D4 | no obstacle | no obstacle | no obstacle | no obstacle | obstacle present |
| G7 | obstacle present | obstacle present | no obstacle | no obstacle | obstacle present |

FIG. 9

WIRELESS TERMINAL, WIRELESS COMMUNICATION SYSTEM, AND WIRELESS COMMUNICATION CONTROL DEVICE

CROSS-REFERENCE TO RELATED APPLICATIONS

This application claims priority to Japanese Patent Application No. 2013-011468 filed on Jan. 24, 2013, the entire contents of which are incorporated by reference herein.

BACKGROUND

1. Technical Field

The disclosure relates to a wireless terminal, a wireless communication system, and a wireless communication controller.

2. Description of the Related Art

Airplanes may conventionally accommodate In-Flight Entertainment (IFE) systems, which allow passengers to view or use AV content including movies and music, games, and the Internet.

Such an IFE system may include, for example, an in-flight server installed in an airplane, and seat monitors arranged at the respective seats, which connect to the in-flight server with wireless communication. In this system, data including AV content is transmitted wirelessly from the in-flight server to the seat monitors (refer to, for example, Japanese Unexamined Patent Publication No. 2007-243884).

Many passengers now carry wireless terminals, such as smartphones. Thus, using the wireless terminals to communicate with the IFE system and access the content and other data is now requested.

However, the above conventional structures have the problems described below.

A wireless access point for a communication apparatus like the above IFE system is located at varying distances from the respective seats. Thus, each wireless terminal may not be under an appropriate condition for communication with the wireless access point.

The disclosure provides a wireless terminal, a wireless communication system, and a wireless communication controller that enable communication under more appropriate conditions.

SUMMARY

A wireless terminal according to a first aspect of the disclosure is a wireless terminal that communicates with a wireless communication apparatus including one or more wireless access points. The wireless terminal is used in a facility including a plurality of seats. The wireless terminal includes a seat position identifying unit, a distance determination unit, and a terminal-side processing setting unit. The seat position identifying unit identifies a seat position of a user of the wireless terminal. The distance determination unit determines a distance from the identified seat position to the one or more wireless access points. The terminal-side processing setting unit sets processing associated with communication based on information about the determined distance.

A wireless terminal according to a second aspect of the disclosure is a wireless terminal that communicates with a wireless communication apparatus including one or more wireless access points. The wireless terminal is used in a facility including a plurality of seats. The wireless terminal includes a seat position identifying unit, a distance determination unit, and a transmission unit. The seat position identifying unit identifies a position of a user of the wireless terminal. The distance determination unit determines a distance from the identified seat position to the one or more wireless access points. The transmission unit transmits information about the determined distance to the one or more wireless access points to set processing associated with communication.

A wireless terminal according to a third aspect of the disclosure is a wireless terminal that communicates with a wireless communication apparatus including one or more wireless access points. The wireless terminal is used in a facility including a plurality of seats. The wireless terminal includes a seat position identifying unit, a communication unit, and a terminal-side processing setting unit. The seat position identifying unit identifies a position of a user of the wireless terminal. The communication unit transmits information about the identified seat position to the wireless communication apparatus, and receives information about a distance from the wireless terminal to the one or more wireless access points determined based on information about the seat position. The terminal-side processing setting unit sets processing associated with communication based on information about the distance.

A wireless terminal according to a fourth aspect of the disclosure is a wireless terminal that communicates with a wireless communication apparatus including one or more wireless access points. The wireless terminal is used in a facility including a plurality of seats. The wireless terminal includes a seat position identifying unit and a transmission unit. The seat position identifying unit identifies a position of a user of the wireless terminal. The transmission unit transmits information about the identified seat position to the one or more wireless access points to set processing associated with communication.

A wireless communication controller according to a first aspect of the disclosure is a wireless communication controller that controls communication with a wireless terminal via a wireless access point. The wireless communication controller is used in a facility including a plurality of seats. The wireless communication controller includes a distance determination unit. The distance determination unit determines a distance from the wireless terminal to the wireless access point based on information about a seat position of a user of the wireless terminal that is transmitted from the wireless terminal. A wireless communication controller transmits information about the determined distance to the wireless terminal via the wireless access point.

A wireless communication controller according to a second aspect of the disclosure is a wireless communication controller that controls communication with a wireless terminal via a wireless access point. The wireless communication controller is used in a facility including a plurality of seats. The wireless communication controller includes a distance determination unit and a processing setting unit. The distance determination unit determines a distance from the wireless terminal to the wireless access point based on information about a seat position of a user of the wireless terminal that is transmitted from the wireless terminal. The processing setting unit sets processing associated with communication based on information about the determined distance.

The wireless terminal, the wireless communication system, and the wireless communication controller according to the disclosure enable communication to be performed under more appropriate conditions.

BRIEF DESCRIPTION OF THE DRAWINGS

FIG. 7 shows data indicating the distance between each seat position and every wireless AP in the third embodiment.

FIG. 9 shows information about the surrounding arrangement of each seat in the third embodiment.

DETAILED DESCRIPTION

Embodiments will now be described with reference to the drawings, while unnecessary details may be excluded. To avoid redundancy and to facilitate understanding of persons skilled in the art, for example, matters known in the art may not be described in detail and components that are substantially the same as the components described may not be described.

The following description and the accompanying drawings are provided by the applicant to enable any person skilled in the art to fully understand the disclosure, and are not intended to limit the subject matter claimed.

First Embodiment

A wireless terminal, a wireless communication controller, and a wireless communication system according to a first embodiment of the disclosure will now be described with reference to FIGS. 1 to 3.

1-1. Structure 1-1-1. Airplane 2

Figure 1:
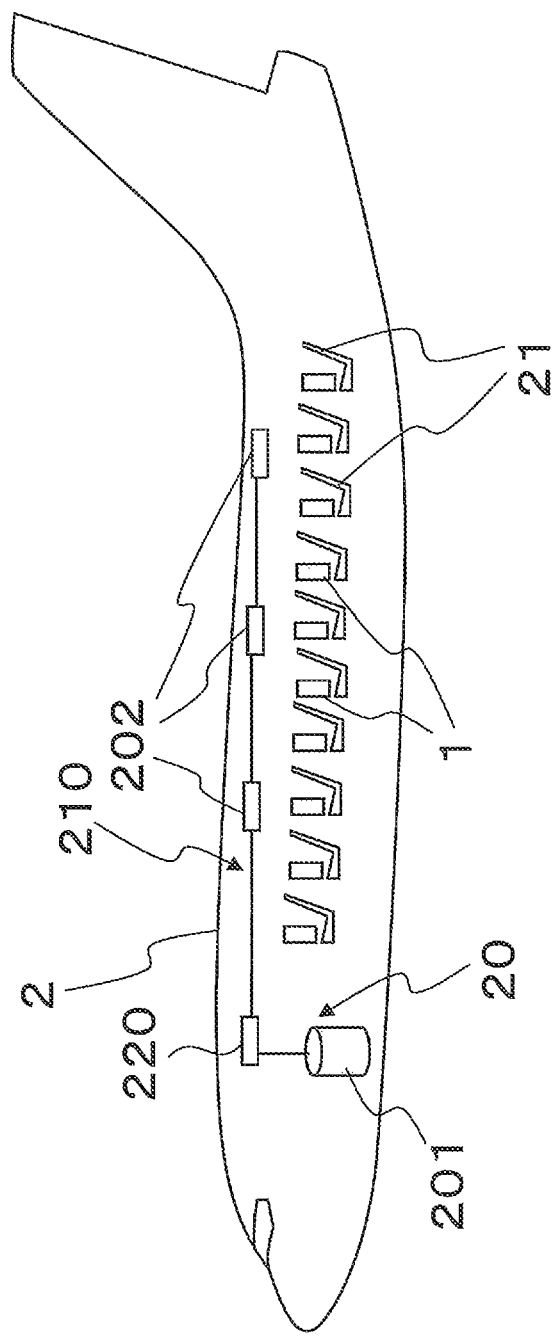
FIG. 1 is a block diagram showing the structure of an airplane according to a first embodiment.

FIG. 1 shows the structure of an airplane 2 according to the first embodiment.

As shown in FIG. 1, the airplane 2 includes an in-flight entertainment (IFE) system 20 and a plurality of seats 21. The IFE system 20 includes an in-flight server 201 and a wireless communication apparatus 210.

The in-flight server 201 stores, for example, AV content including movies and music, and the portal site of the airline company. FIG. 1 shows wireless terminals 1, which are carried into the airplane 2 by passengers, at the positions of the individual seats 21.

The wireless communication apparatus 210, which communicates with the wireless terminals 1, includes a communication controller 220 (an example of a wireless communication controller) and a plurality of wireless access points (wireless APs) 202.

Figure 2:
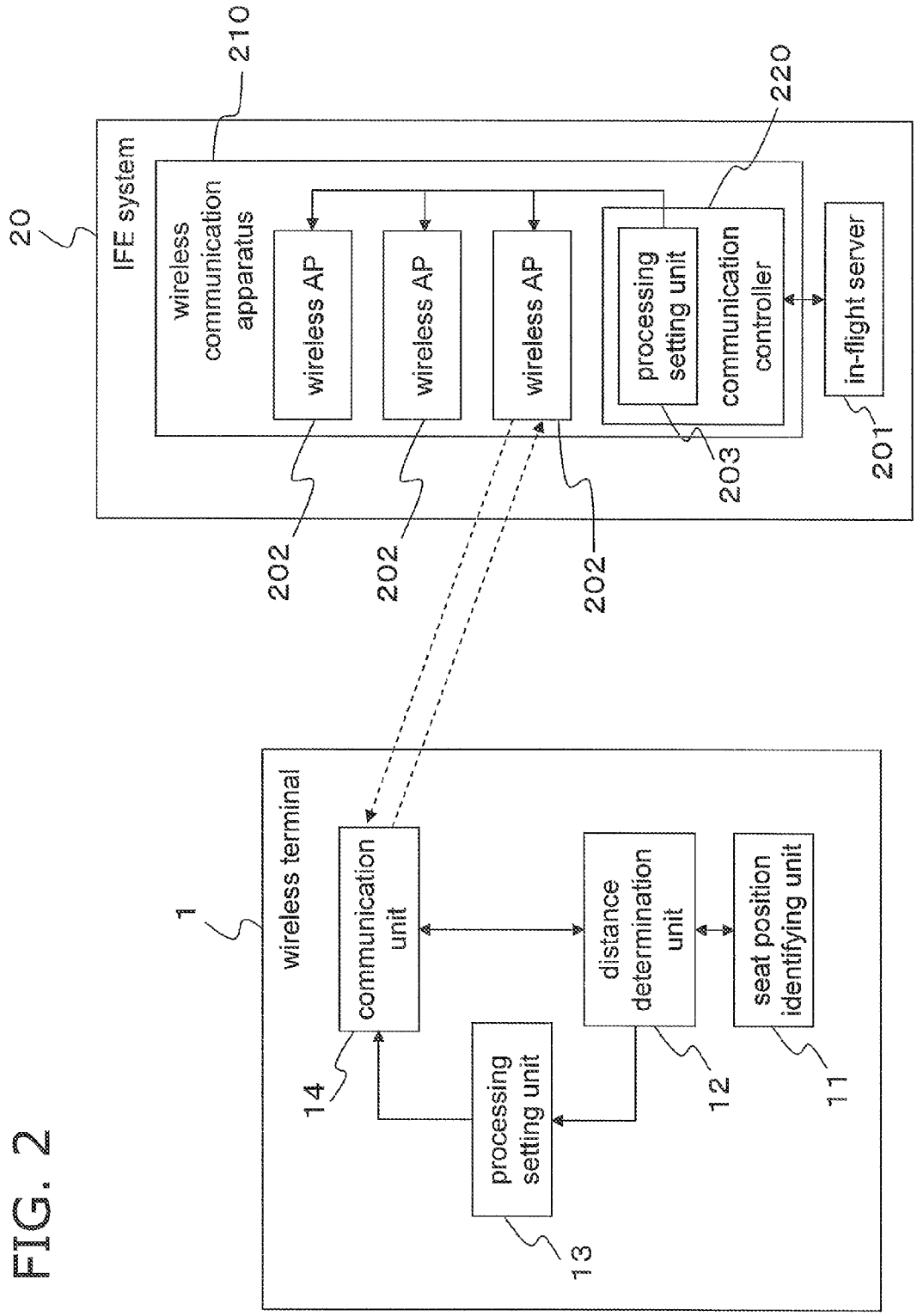
FIG. 2 is a block diagram of a wireless terminal and an IFE system in the first embodiment.

FIG. 2 is a block diagram showing the structure of the wireless terminal 1 and the IFE system 20 in the first embodiment. As shown in FIG. 2, the IFE system 20 includes the wireless communication apparatus 210 and the in-flight server 201. The wireless communication apparatus 210 includes a communication controller 220 (an example of a wireless communication controller), which controls communication between the wireless APs 202 and the wireless terminal 1. The communication controller 220 includes a processing setting unit 203. The processing setting unit 203 performs various settings for transmission from the wireless APs 202 to the wireless terminal 1 based on distance information transmitted from a communication unit 14 (described later) included in the wireless terminal 1. The various settings include the physical layer (PHY) communication rate and the data size to be used in communication from the wireless APs 202 to the wireless terminal 1, and selection of the wireless AP 202. When the distance is short, the communication rate can be set higher. Thus, the transfer rate is set large (at, for example, 54 Mbps for IEEE802.11g) when the distance is short. The transfer rate is set small (at, for example, 6 Mbps for IEEE802.11g) when the distance is long.

When the distance is short, the data size can be set large. When the distance is long, the data size can be set small. For example, when the distance is short, the data size is set to transmit high quality moving images. When the distance is long, the data is set to transmit low quality images.

The selection of the wireless AP 202 is set, for example, to select a wireless AP 202 nearest to the seat position.

1-1-2. Wireless Terminal 1

The wireless terminal 1 according to the first embodiment will now be described. The wireless terminal 1 according to the first embodiment is a tablet terminal.

FIG. 2 is a block diagram showing the structure of the wireless terminal 1 and the IFE system 20 according to the first embodiment. As shown in FIG. 2, the wireless terminal 1 includes a seat position identifying unit 11 (an example of a seat position identifying unit), a distance determination unit 12, a processing setting unit 13 (an example of a terminal-side processing setting unit), and a communication unit 14 (an example of a transmission unit).

The seat position identifying unit 11 identifies the position of the user of the wireless terminal 1. More specifically, the wireless terminal 1 of the first embodiment is a tablet terminal, into which a passenger may manually input his or her seat number or the like to allow the position of the user of the wireless terminal 1 to be identified.

The distance determination unit 12 determines the distance from the seat position to the wireless AP 202. More specifically, the in-flight server 201 stores tabular data about the distance from each seat 21 in the airplane 2 to every wireless AP 202. Based on the tabular data, the distance determination unit 12 obtains information about the distance from the identified seat position to the wireless AP 202 to be selected. When the system includes a plurality of wireless APs 202, the table also stores information identifying the wireless AP 202 to be selected as the wireless AP 202 used for communication.

The processing setting unit 13 performs various settings based on the distance determined by the distance determination unit 12. The various settings include settings associated with the PHY communication rate, the data size, and the initial value of automatic gain control (AGC) from the wireless terminal 1 to the corresponding wireless AP 202. When the distance from the wireless AP 202 is short, the initial value of AGC is set large. In the airplane, the ceiling is low and thus the wireless terminal 1 can be located in the vicinity of the wireless AP. The initial value of AGC is set large when the distance from the wireless AP 202 is small to allow radio waves to be received in a stable manner.

The communication unit 14 transmits information about the distance determined by the distance determination unit 12 to the wireless AP 202.

1-2. Operation

An example of a method for controlling wireless communication according to the present embodiment will now be described.

Figure 3:
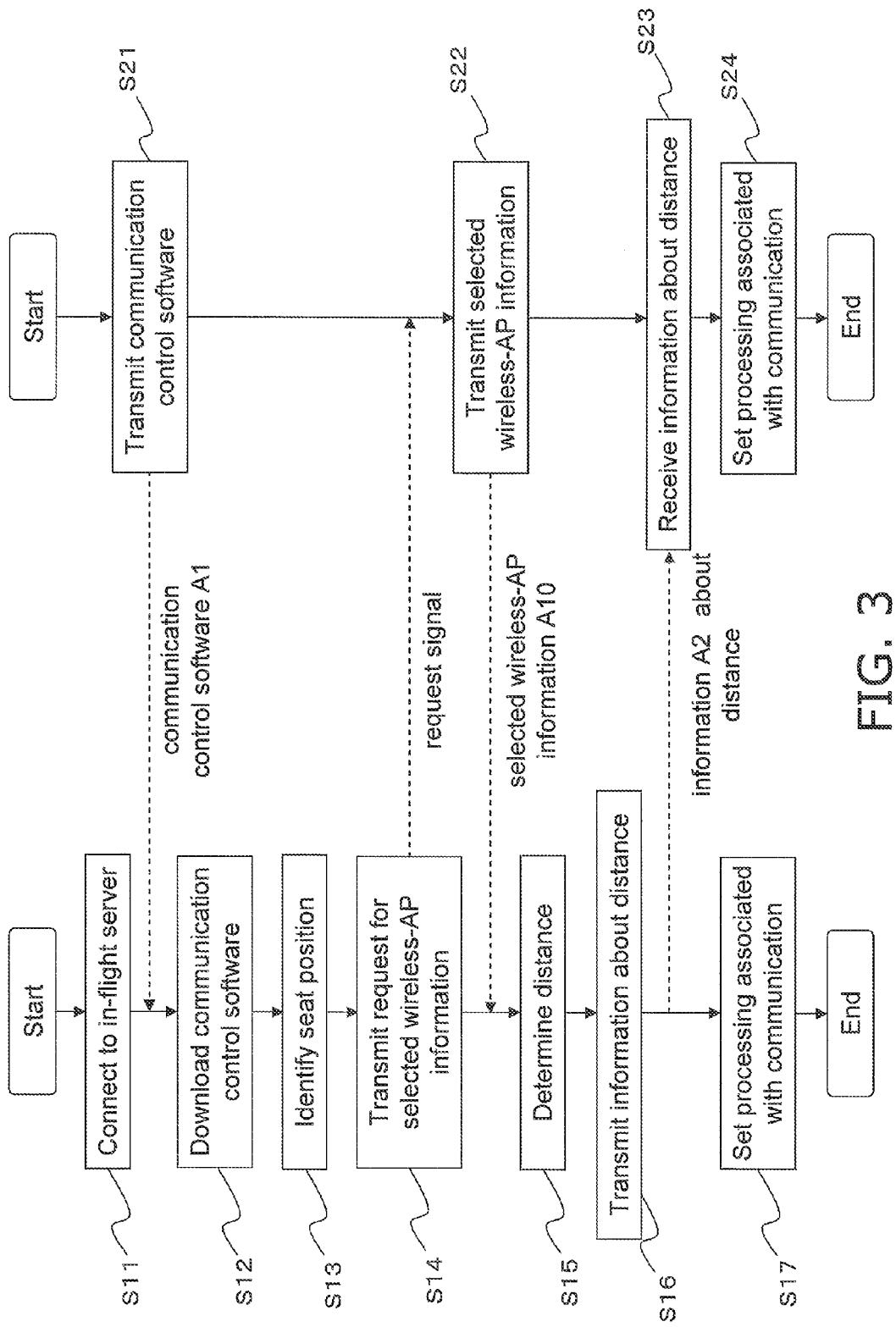
FIG. 3 is a flowchart showing the control of the wireless terminal and the wireless communication apparatus according to the first embodiment.

FIG. 3 is a flowchart showing the control of the operation performed by the wireless terminal 1 and the wireless communication apparatus 210 of the airplane 2. Steps S11 to S17 indicate a control process performed by the wireless terminal 1. Steps S21 to S24 indicate a control process performed by the wireless communication apparatus 210.

In step S11 of FIG. 3, the user of the wireless terminal 1 entering the airplane 2 accesses the in-flight server 201 via an arbitrary wireless AP 202 with the communication unit 14, thus connecting the wireless terminal 1 to the in-flight server 201.

Subsequently, the user downloads communication control software A1 from the portal site stored in the in-flight server 201 into the wireless terminal 1. More specifically, the wireless communication apparatus 210 transmits the communication control software A1 from the in-flight server 201 to the wireless terminal 1 in step S21. The wireless terminal 1 receives the communication control software A1 in step S12.

In step S13 (an example of a position determination step), the seat position of the user of the wireless terminal 1 is identified by the seat position identifying unit 11. The seat position is identified through manual input of the seat number into the wireless terminal 1 by the passenger.

In step S14, a request for information A10 about the wireless AP to be selected as the wireless AP used for communication (referred to as selected wireless-AP information) is transmitted to the in-flight server 201 via the wireless AP 202.

In response to this request signal, in step S22, the wireless communication apparatus 210 transmits the selected wireless-AP information A10 to the wireless terminal 1.

In step S15 (an example of a distance determination step), the distance determination unit 12 selects the wireless AP 202 based on the seat position identified by the position identifying unit 11 using the selected wireless-AP information A10 and determines the distance from the wireless terminal 1 to the wireless AP 202. The selected wireless-AP information A10 is tabular data indicating the wireless AP to be selected for each seat and the distance to the wireless AP to be selected for each seat. The distance is determined by referring to the table. The table is based on the arrangement of the wireless APs 202 and the seats 21 designed for the airplane 2. When, for example, the system includes five wireless APs 202, or wireless AP(1) to wireless AP(5), the table stores the wireless AP(3) 202 as the wireless AP 202 to be selected for the seat position A1 and stores the distance of 3 m as the distance from the seat position A1 to the wireless AP(3), and also stores the wireless AP(4) as the wireless AP 202 to be selected for the seat position F4 and stores the distance of 5 m as the distance from the seat position F4 to the wireless AP(4).

In step S16, the information A2 about the determined distance is transmitted to the wireless AP 202 with the communication unit 14.

In step S17 (an example of a processing setting step), the processing setting unit 13 included in the wireless terminal 1 sets the processing associated with communication performed by the wireless terminal 1. More specifically, as described above, the processing setting unit 13 sets selection of the wireless AP 202 used for communication with the wireless terminal 1, the PHY communication rate and the data size, and the initial value of AGC to be used in communication from the wireless terminal 1 to the wireless AP 202.

When the wireless communication apparatus 210 receives the information A2 about the distance in step S23, the processing setting unit 203 sets the processing associated with communication performed by the wireless communication apparatus 210 in step S24. More specifically, as described above, the processing setting unit 203 sets the PHY communication rate and the data size to be used in communication from the wireless AP 202 to the wireless terminal 1, and selection of the wireless AP 202 used for transmission and reception.

The operation described above optimizes the communication settings between the wireless terminal 1 and the wireless communication apparatus 210.

1-3. Main Advantages (1-3-1) As described above, the wireless terminal 1 in the above embodiment communicates with the wireless communication apparatus 210 including the plurality of wireless APs 202. The wireless terminal 1 is used in the airplane 2 including the plurality of seats 21. The wireless terminal 1 includes the seat position identifying unit 11, the distance determination unit 12, and the processing setting unit 13 (an example of a terminal-side processing setting unit). The seat position identifying unit 11 identifies the seat position of the user of the wireless terminal 1. The distance determination unit 12 determines the distance from the identified seat position (an example of a seat position) to the corresponding wireless AP 202. The processing setting unit 13 sets the processing associated with communication based on the information about the determined distance.

This structure enables the processing associated with communication from the wireless AP 202 toward the wireless terminal 1 to be set in accordance with the distance from the wireless AP, and thus enables communication to be performed under more appropriate conditions.

(1-3-2) In the present embodiment, the processing setting unit 13 (an example of a terminal-side processing setting unit) sets the data communication rate, the data size, or the initial value of AGC to be used in communication from the wireless terminal 1 to the corresponding wireless AP 202.

In this case, the wireless terminal 1 can have a low data communication rate when the distance from the wireless AP 202 is long, and can have a high data communication rate when the distance from the wireless AP 202 is short. The wireless terminal 1 can also have a small data size when the distance from the wireless AP 202 is long, and can have a large data size when the distance from the wireless AP 202 is short. Setting the initial value of AGC larger as the distance from the wireless AP 202 is shorter further allows the wireless terminal 1 to receive radio waves in a stable manner.

As described above, the wireless terminal 1 can perform appropriate communication in accordance with the distance from the wireless AP 202.

(1-3-3) In the present embodiment, the information about the distance includes information identifying the wireless AP to be selected from the plurality of wireless APs 202 as the wireless AP used for communication. The processing setting unit 13 (an example of a terminal-side processing setting unit) sets the selected wireless AP 202 as the wireless AP 202 used for communication.

This structure enables, for example, the wireless AP 202 nearest to the seat position of the user of the wireless terminal 1 to be selected for communication with the wireless terminal 1, and thus enables more appropriate communication.

(1-3-4) In the present embodiment, the wireless terminal 1 communicates with the wireless communication apparatus 210 including the plurality of wireless APs 202. The wireless terminal 1 is used in the facility including the plurality of seats. The wireless terminal 1 includes the seat position identifying unit 11, the distance determination unit 12, and the communication unit 14 (an example of a transmission unit). The seat position identifying unit 11 identifies the seat position of the user of the wireless terminal 1 (an example of a seat position). The distance determination unit 12 determines the distance from the identified seat position to the corresponding wireless AP. The communication unit 14 transmits the information about the determined distance to the wireless AP 202 to set the processing associated with communication.

This structure enables the information about the distance to be transmitted to the wireless communication apparatus 210, and thus enables the wireless communication apparatus 210 to set the processing associated with communication in accordance with the distance from the wireless AP 202 to the wireless terminal 1, and enables communication to be performed under more appropriate conditions.

(1-3-5) In the present embodiment, the processing associated with communication includes setting the data communication rate or the data size to be used in communication from the wireless AP 202 to the wireless terminal 1.

The wireless communication apparatus 210 can have a low data communication rate when the distance from the wireless AP 202 to the wireless terminal 1 is long, and can have a high data communication rate when the distance from the wireless AP 202 is short. The wireless communication apparatus 210 can have a small data size when the distance from the wireless AP 202 is long, and can have a large data size when the distance from the wireless AP 202 is short.

(1-3-6) In the present embodiment, the processing associated with communication refers to selectively setting one of the plurality of wireless APs 202 as the wireless AP 202 used for communication.

This structure enables, for example, the wireless AP 202 nearest to the seat position of the user of the wireless terminal 1 to be selected for communication with the wireless terminal 1, and thus enables more appropriate communication.

(1-3-7) In the present embodiment, the wireless communication system includes the wireless terminal 1 and the wireless communication apparatus 210. The wireless communication apparatus 210 includes the wireless APs 202 and the processing setting unit 203. The wireless APs 202 communicate with the wireless terminal 1. The processing setting unit 203 sets the processing associated with communication based on the information about the distance transmitted from the wireless terminal 1.

In this system, both the wireless terminal 1 and the wireless communication apparatus 210 are capable of setting the processing associated with communication in accordance with the distance. This structure enables more appropriate communication.

(1-3-8) As described above, the method for controlling wireless communication in the present embodiment includes step S13 (an example of a seat position identification step), step S14 (an example of a distance determination step), and step S16 (an example of a processing setting step). In step S13, the seat position of the user of the wireless terminal, which is used in the airplane 2 including the plurality of seats 21, is identified through communication via the corresponding wireless AP 202. In step S14, the distance from the identified seat position to the corresponding wireless AP 202 is determined. In step S16, the processing associated with communication is set based on the determined distance.

This method enables the processing associated with communication between the wireless terminal 1 and the wireless AP 202 to be set in accordance with the distance from the wireless AP 202, and enables communication to be performed under more appropriate conditions.

Second Embodiment

A wireless terminal, a wireless communication controller, and a wireless communication system according to a second embodiment of the disclosure will now be described with reference to FIGS. 4 and 5.

In the second embodiment, the distance from the wireless terminal 1 to the corresponding wireless AP 202 is determined by the wireless communication apparatus 310. The same description as in the first embodiment is omitted as necessary.

2-1. Structure 2-1-1. IFE System 30

Figure 4:
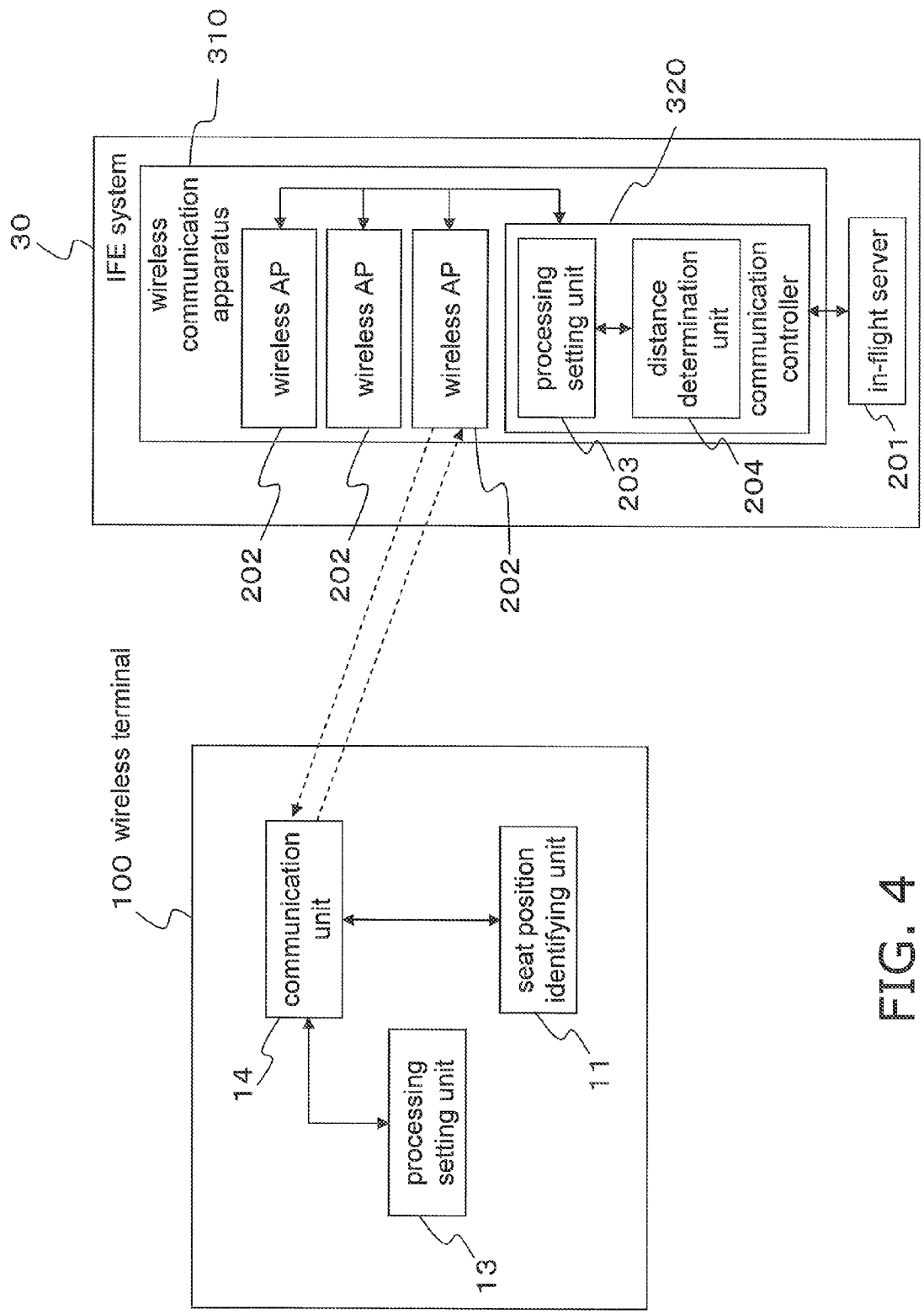
FIG. 4 is a block diagram of a wireless terminal and an IFE system in a second embodiment.

FIG. 4 shows the structure of a wireless terminal 1 and an IFE system 30 according to the second embodiment.

As shown in FIG. 4, the IFE system 30 in the second embodiment includes a wireless communication apparatus 310 and an in-flight server 201. The wireless communication apparatus 310 communicates with the wireless terminal 1, and includes a plurality of wireless APs 202 and a communication controller 320 (an example of a wireless communication controller). The communication controller 320 controls communication with the wireless terminal 1 performed via the wireless AP 202. The communication controller 320 includes a processing setting unit 203 and a distance determination unit 204.

The distance determination unit 204 selects a wireless AP 202 at an appropriate location using the selected wireless-AP information based on the seat positional information A3 transmitted from the wireless terminal 1, and determines the distance between the selected wireless AP 202 and the seat position.

2-1-2. Wireless Terminal 100

As shown in FIG. 4, the wireless terminal 100 according to the second embodiment includes a seat position identifying unit 11, a processing setting unit 13, and a communication unit 14. More specifically, the wireless terminal 100 according to the second embodiment does not include the distance determination unit 12, unlike the wireless terminal 1 according to the first embodiment.

2-2. Operation

An example of a method for controlling wireless communication according to the present embodiment will now be described.

Figure 5:
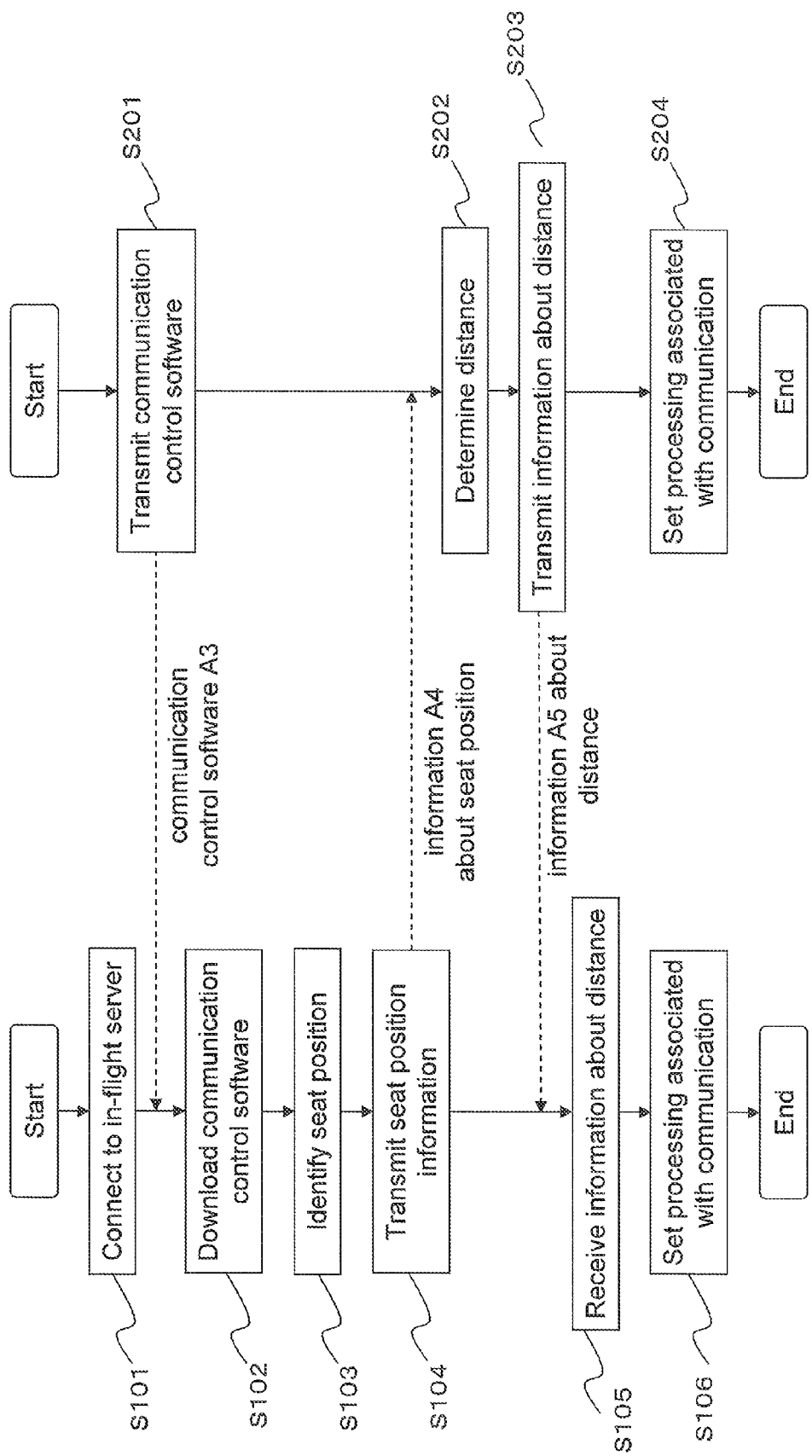
FIG. 5 is a flowchart showing the control of the wireless terminal and the wireless communication apparatus in the second embodiment.

FIG. 5 is a flowchart showing the control of the operation performed by the wireless terminal 100 and the wireless communication apparatus 310 of the airplane 2. Steps S101 to S106 indicate a control process performed by the wireless terminal 100. Steps S210 to S204 indicate a control process performed by the wireless communication apparatus 310.

In step S101 in FIG. 5, the user of the wireless terminal 1 entering the airplane 2 accesses the in-flight server 201 via an arbitrary wireless AP 202 with the communication unit 14, thus connecting the wireless terminal 1 to the in-flight server 201.

Subsequently, the user downloads communication control software A1 from the portal site stored in the in-flight server into the wireless terminal 100. More specifically, the wireless communication apparatus 310 transmits the communication control software A3 from the in-flight server 201 to the wireless terminal 1 in step S201. The wireless terminal 100 receives the communication control software A3 in step S102.

In step S103 (an example of a seat position identification step), the seat position of the user of the wireless terminal 100 is identified by the seat position identifying unit 11. The seat position is identified through manual input of the seat number into the wireless terminal 100 by the passenger.

In step S104 (an example of a distance determination step), the wireless terminal 100 transmits information A4 about the identified seat position to the wireless AP 202 with the communication unit 14.

In step S203, the distance determination unit 204 included in the wireless communication apparatus 310 identifies a wireless AP 202 at an appropriate location relative to the wireless terminal 100 based on the transmitted information A4 about the seat position, and determines the distance from the identified wireless AP 202 to the wireless terminal 100 (seat position). The distance is determined by the distance determination unit 204 referring to the table in the same manner as in the first embodiment.

In step S203, the wireless communication apparatus 310 transmits the information A5 about the distance to the wireless terminal 1 via the wireless AP 202.

In response to the information A5 about the distance (S105), the processing setting unit 13 of the wireless terminal 1 sets the processing associated with communication in step S106.

In step S204, the wireless communication apparatus 310 also sets the processing associated with communication based on the information about the distance determined in step S202.

As described above, the distance determination unit for determining the distance between the wireless AP 202 and the wireless terminal 100 may be arranged in the wireless communication apparatus. This structure also optimizes the communication settings between the wireless terminal 100 and the wireless communication apparatus 210.

2-3 Main Advantages (2-3-1) As described above, the wireless terminal 100 in the present embodiment communicates with the wireless communication apparatus 310 including the plurality of wireless APs 202. The wireless terminal 100 is used in the airplane 2 including the plurality of seats 21. The wireless terminal 1 includes the seat position identifying unit 11, the communication unit 14, and the processing setting unit 13. The seat position identifying unit 11 identifies the seat position of the user of the wireless terminal (an example of a seat position). The communication unit 14 transmits information about the identified seat position to the wireless communication apparatus 210, and receives information about the distance identified based on the information about the seat position between the wireless terminal 100 and the corresponding wireless AP 202. The processing setting unit 13 sets the processing associated with communication based on the information about the distance.

As a result, the wireless terminal 100 can receive information about the distance from the wireless AP 202 to the wireless terminal 100 from the wireless communication apparatus 310. This structure enables the processing associated with communication from the wireless AP 202 toward the wireless terminal 100 to be set in accordance with the distance, and enables communication to be performed under more appropriate conditions.

(2-3-2) Further, the processing setting unit 13 (an example of a terminal-side processing setting unit) in the present embodiment sets the data communication rate, the data size, or the initial value of AGC to be used in communication from the wireless terminal AP 202 to the wireless terminal 100.

When the distance from the wireless AP 202 to the wireless terminal 1 is long, the data communication rate can be set low. When the distance from the wireless AP 202 is short, the data communication rate can be set high. Further, the data size can be set small when the distance from the wireless AP 202 is long. The data size can be set large when the distance from the wireless AP 202 is short. Setting the initial value of AGS larger as the distance from the wireless AP 202 is smaller further allows radio waves to be received in a stable manner.

As described above, the wireless terminal 100 can perform appropriate communication in accordance with the distance from the wireless AP 202.

(2-3-3) Further, the information about the distance in the present embodiment includes information about the wireless AP to be selected from the plurality of wireless APs 202 as the wireless AP used for communication. The processing setting unit 13 (an example of a terminal-side processing setting unit) sets the selected wireless AP 202 as the wireless AP used for communication.

This structure enables, for example, the wireless AP 202 nearest to the seat position of the user of the wireless terminal 100 to be selected for communication with the wireless terminal 100, and thus enables more appropriate communication.

(2-3-4) In the present embodiment, the wireless communication system includes the wireless terminal 100 and the wireless communication apparatus 310. The wireless communication apparatus 310 includes the wireless APs 202 and the distance determination unit 204. The wireless APs 202 communicate with the wireless terminal 100. The distance determination unit 204 identifies the distance to the corresponding wireless AP 202 based on the information about the seat position transmitted from the wireless terminal 100. The wireless communication apparatus 310 transmits information about the determined distance to the wireless terminal 100 via the wireless AP 202.

This structure enables the wireless terminal 100 to receive the information about the distance from the wireless AP 202 to the wireless terminal 100 from the wireless communication apparatus 310, and enables the processing associated with communication from the wireless terminal 100 toward the wireless AP 202 to be set in accordance with the distance, and thus enables communication to be performed under still more appropriate conditions.

(2-3-5) Further, the communication controller 320 (an example of a wireless communication controller) in the present embodiment is a wireless communication controller that controls communication with the wireless terminal 100, which is used in the airplane 2 including the plurality of seats 21, via the wireless AP 202. The communication controller 320 includes the distance determination unit 204. The distance determination unit 204 determines the distance from the wireless terminal 100 to the corresponding wireless AP 202 based on the information about the seat position of the user of the wireless terminal 100 transmitted from the wireless terminal 100. The communication controller 320 transmits the information about the determined distance to the wireless terminal 100 via the wireless AP 202.

This structure enables the information about the distance from the wireless AP 202 to the wireless terminal 100 to be transmitted to the wireless terminal 100, and enables the wireless terminal 100 to set the processing associated with communication from the wireless terminal 100 toward the wireless AP 202 in accordance with the distance, and thus enables communication to be performed under more appropriate conditions.

(2-3-6) The wireless terminal 1 in the present embodiment communicates with the wireless communication apparatus 310 including the plurality of wireless APs 202. The wireless terminal 1 is used in the airplane including the plurality of seats 21 (an example of a facility). The wireless terminal 1 includes the seat position identifying unit 11 and the communication unit 14 (an example of a transmission terminal). The seat position identifying unit 11 identifies the seat position of the user of the wireless terminal 1. The communication unit 14 transmits information about the identified seat position to the wireless AP 202 to set the processing associated with communication.

This structure enables the information about the distance to be transmitted to the wireless communication apparatus 310, and thus enables the wireless communication apparatus 310 to set the processing associated with communication at least from the wireless communication apparatus 310 toward the wireless terminal 1 in accordance with the distance from the wireless AP 202 to the wireless terminal 1, and thus enables communication to be performed under more appropriate conditions.

(2-3-7) In the present embodiment, the processing associated with communication includes setting the data communication rate or the data size to be used in communication from the wireless AP 202 to the wireless terminal 1.

The wireless communication apparatus 310 can have a low data communication rate when the distance from the wireless AP 202 is long, and can have a high data communication rate when the distance from the wireless AP 202 is short. The wireless communication apparatus 310 can also have a small data size when the distance from the wireless AP 202 is long, and can have a large data size when the distance from the wireless AP 202 is short.

(2-3-8) In the present embodiment, the processing associated with communication refers to selectively setting one of the plurality of wireless APs 202 as the wireless AP 202 used for communication.

This structure enables, for example, the wireless AP 202 nearest to the seat position of the user of the wireless terminal 1 to be selected for communication with the wireless terminal 1, and enables more appropriate communication.

(2-3-9) In the present embodiment, the wireless communication system includes the wireless terminal 100 and the wireless communication apparatus 310. The wireless communication apparatus 310 includes the wireless APs 202, the distance determination unit 204, and the processing setting unit 203. The wireless APs 202 communicate with the wireless terminal 100. The distance determination unit 204 determines the distance to the corresponding wireless AP 202 based on the information about the seat position transmitted from the wireless terminal 100. The processing setting unit 203 sets the processing associated with communication based on the determined distance.

This structure enables the processing associated with communication between the wireless terminal 1 and the wireless AP 202 to be set in accordance with the distance from the wireless AP 202, and thus enables communication to be performed under more appropriate conditions.

(2-3-10) In the present embodiment, the communication controller 320 (an example of a wireless communication controller) is a wireless communication controller that controls communication with the wireless terminal 100, which is used in the airplane 2 including the plurality of seats 21 (an example of a facility), via the wireless AP 202. The communication controller 320 includes the distance determination unit 204 and the processing setting unit 203. The distance determination unit 204 determines the distance from the wireless terminal 100 to the corresponding wireless AP 202 based on the information about the seat position of the user of the wireless terminal 100 transmitted from the wireless terminal 100. The processing setting unit 203 sets the processing associated with communication based on the information about the determined distance.

This structure enables the communication controller 320 to set the processing associated with communication in accordance with the distance from the wireless AP 202 to the wireless terminal 1, and thus enables communication to be performed under more appropriate conditions.

(2-3-11) In the present embodiment, the processing setting unit 203 sets the data communication rate or the data size to be used in communication from the wireless AP 202 to the wireless terminal 100.

The communication controller 320 can have a low data communication rate when the distance from the wireless AP 202 is long, and can have a large data communication rate when the distance from the wireless AP 202 is short. The communication controller 320 can also have a small data size when the distance from the wireless AP 202 is long, and can have a large data size when the distance from the wireless AP 202 is short.

(2-3-12) In the present embodiment, the information about the distance includes information identifying the wireless AP 202 to be selected from the plurality of wireless APs as the wireless AP used for communication. The processing setting unit 203 sets the selected wireless AP 202 as the wireless AP 202 used for communication.

This structure enables, for example, the wireless AP 202 nearest to the seat position of the user of the wireless terminal 1 to be selected for communication with the wireless terminal 1, and thus enables more appropriate communication.

(2-3-13) As described above, the method for controlling wireless communication in the present embodiment includes step S103 (an example of a seat position identifying step) and step S202 (an example of a distance determination step), and step S106 or 204 (an example of a processing setting step). In step S103, the seat position of the user of the wireless terminal, which is used in the facility including the plurality of seats, is identified through communication via the corresponding wireless AP. In step S104, the distance from the identified seat position to the corresponding wireless AP 202 is determined. In step S106 or S204, the processing associated with communication is set based on the determined distance.

This method enables the processing associated with communication between the wireless terminal 1 and the wireless AP 202 to be set in accordance with the distance from the wireless AP 202, and thus enables communication to be performed under more appropriate conditions.

Third Embodiment

A wireless terminal, a wireless communication controller, and a wireless communication system according to a third embodiment of the disclosure will now be described with reference to FIGS. 6 to 11. The wireless terminal according to the third embodiment differs from the wireless terminal of the first embodiment in the structure and the operation for selecting a wireless AP to be used. The components of the third embodiment that are the same as described in the first and second embodiments may not be described.

3-1. Structure
3-1-1. Wireless Terminal 101

Figure 6:
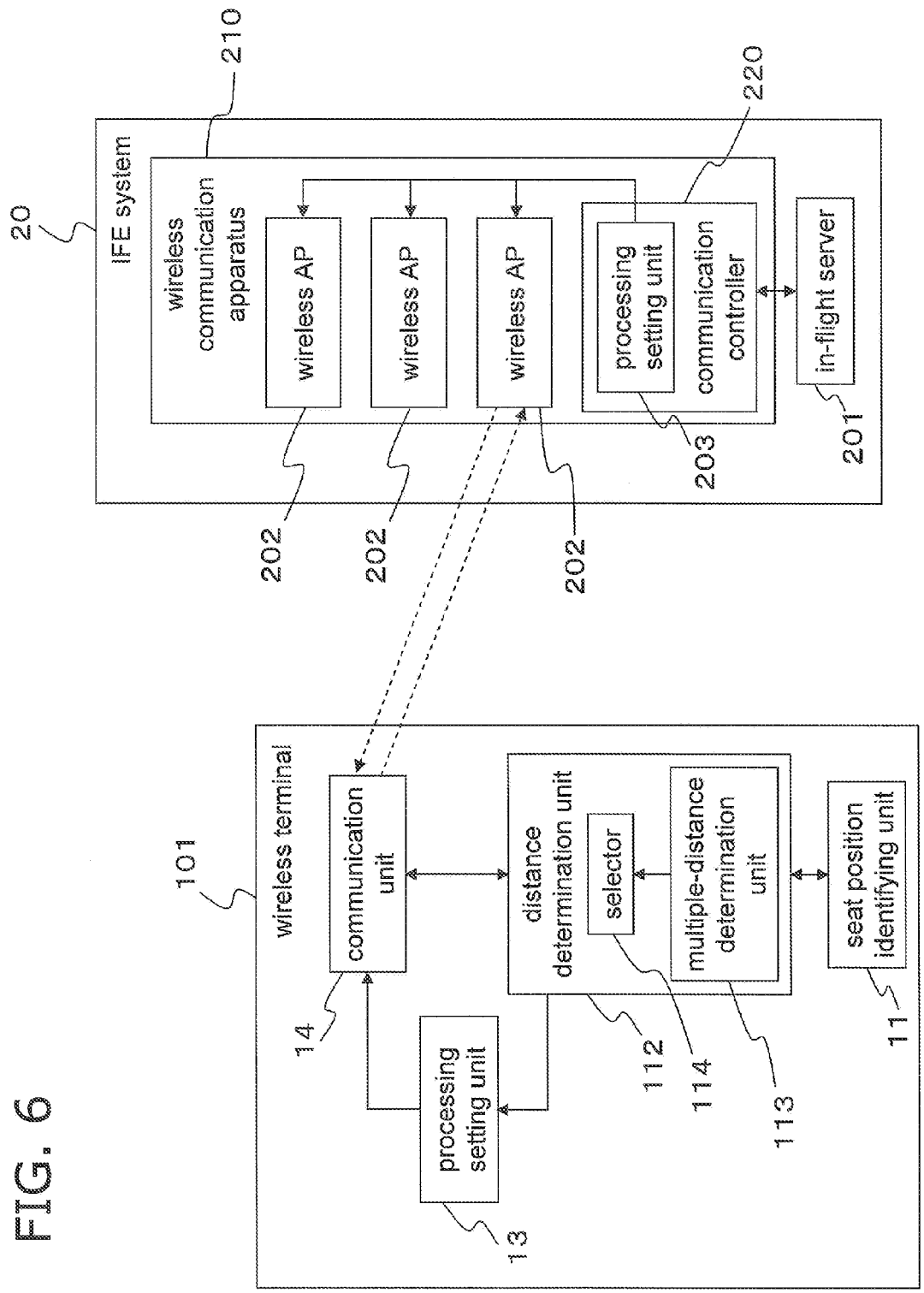
FIG. 6 is a block diagram of a wireless terminal and an IFE system in a third embodiment.

FIG. 6 shows the structure of a wireless terminal 101 and an IFE system 20 according to the third embodiment.

As shown in FIG. 6, the wireless terminal 101 according to the present embodiment includes a distance determination unit 112, which includes a multiple-distance determination unit 113 and a selector 114, unlike the distance determination unit 12 of the first embodiment.

The distance determination unit 112 selects one of the plurality of wireless APs 202 as the wireless AP used for communication, and determines the distance from the selected wireless AP 202 to the seat 21 of the user of the wireless terminal 1 identified by the seat position identifying unit 11, and transmits information about the determined distance to the processing setting unit 13 and the communication unit 14.

The multiple-distance determination unit 113 determines the distance from each of the plurality of wireless APs 202 installed in the airplane 2 to the seat position. The in-flight server 201 stores data indicating the distance from each seat position to every wireless AP 202 (every seat distance information A6, refer to FIG. 10 below). Based on the data, the multiple-distance determination unit 113 determines the distance from the current seat position to every wireless AP 202. The every seat distance information may be, for example, the table shown in FIG. 7. FIG. 7 shows five wireless APs, or wireless AP(1) to wireless AP(5). The table stores data indicating the distance from each seat position to every wireless AP 202.

The selector 114 selects a wireless AP 202 to be set as the wireless AP 202 used for communication based on the information about the distance from the identified seat position to every wireless AP, which is obtained by the multiple-distance determination unit 113, and further based on surrounding arrangement information A7 for the identified seat position (refer to FIG. 10 below).

Figure 8:
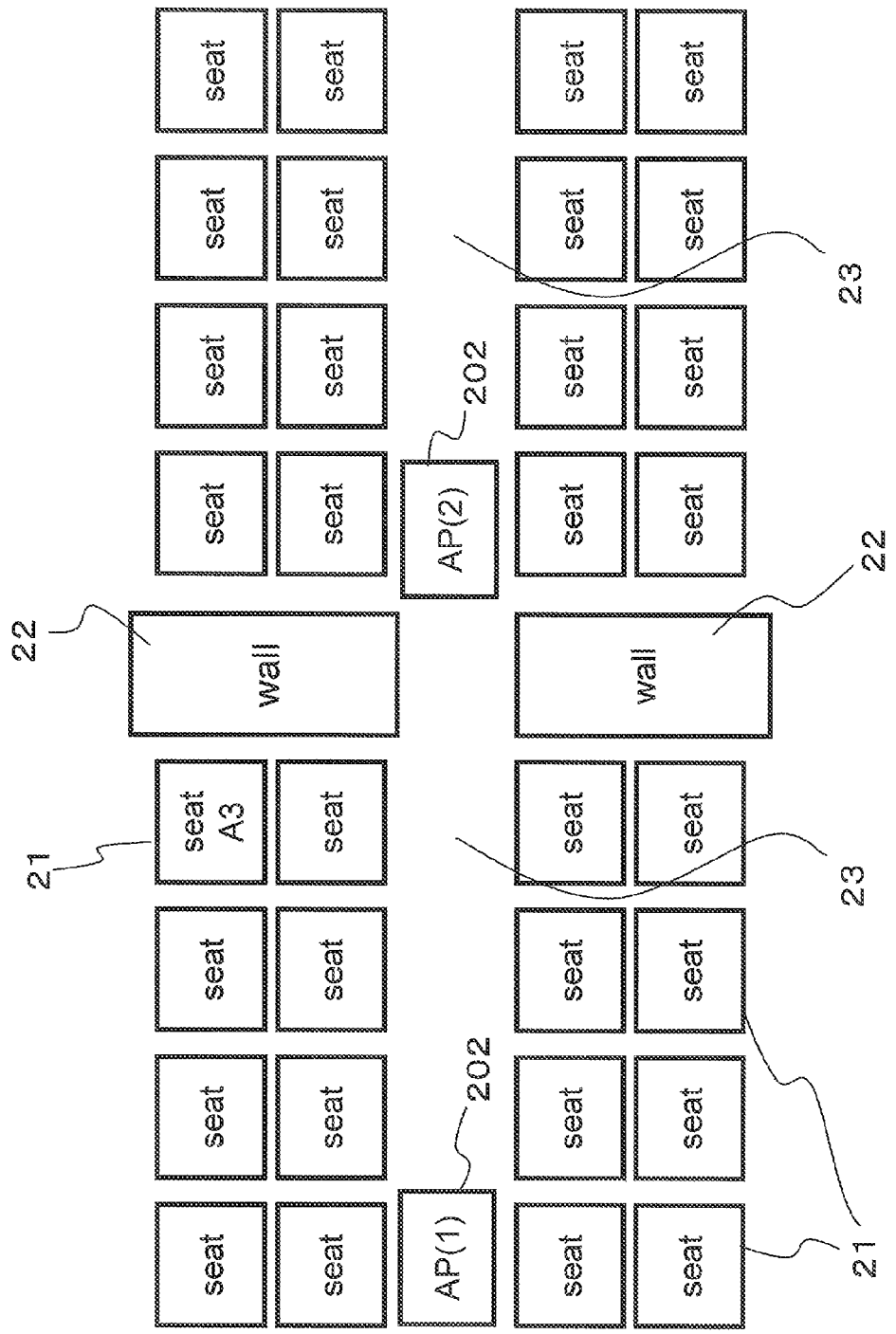
FIG. 8 is a simplified plan view showing the arrangement of seats, walls, and wireless APs in an airplane in the third embodiment.

The surrounding arrangement information A7 refers to information about obstacles present between the identified seat position and the wireless APs. FIG. 8 is a plan view showing the arrangement of the seats 21, the wireless APs 202, and walls 22 in the airplane 2. FIG. 8 shows two wireless APs, or wireless AP(1) 202 and wireless AP(2) 202, arranged on the ceiling facing an aisle 23 between seats 21. The walls 22 can form galleys. In one example, the seat A3 shown in FIG. 8 is at a shorter linear distance from the wireless AP(2) 202 than from the wireless AP(1) 202, but the wall 22 is between the wireless AP(2) 202 and the seat A3. In this case, it is determined that the state of communication would be better when the wireless AP(1) 202 is used. The selector 114 thus selects the wireless AP(1) 202 over the wireless AP(2) 202. More specifically, the in-flight server 201 stores the table shown in FIG. 9. FIG. 9 shows information indicating whether any obstacle is present on the linear path from each seat position to every wireless AP 202.

More specifically, the selector 114 selects the wireless AP used for communication based on the information about the distance to each wireless AP 202 shown in FIG. 7, and further based on the surrounding arrangement information shown in FIG. 9.

3-1-2. IFE System 20

The structure of the IFE system 20 according to the present embodiment is the same as described in the first embodiment and will not be described.

3-2. Operation

The operation of the wireless terminal and the wireless communication controller according to the present embodiment will now be described. An example of a method for controlling wireless communication will also be described FIG. 10 is a flowchart showing the control of the operation performed by the wireless terminal 101 and the wireless communication apparatus 210 of the airplane 2. Steps S11 to S13, S304 and S305, and S15 and S16 shown in FIG. 10 indicate a control process performed by the wireless terminal 101. Steps S21, S402, S23, and S24 indicate a control process performed by the wireless communication apparatus 210.

Figure 10:
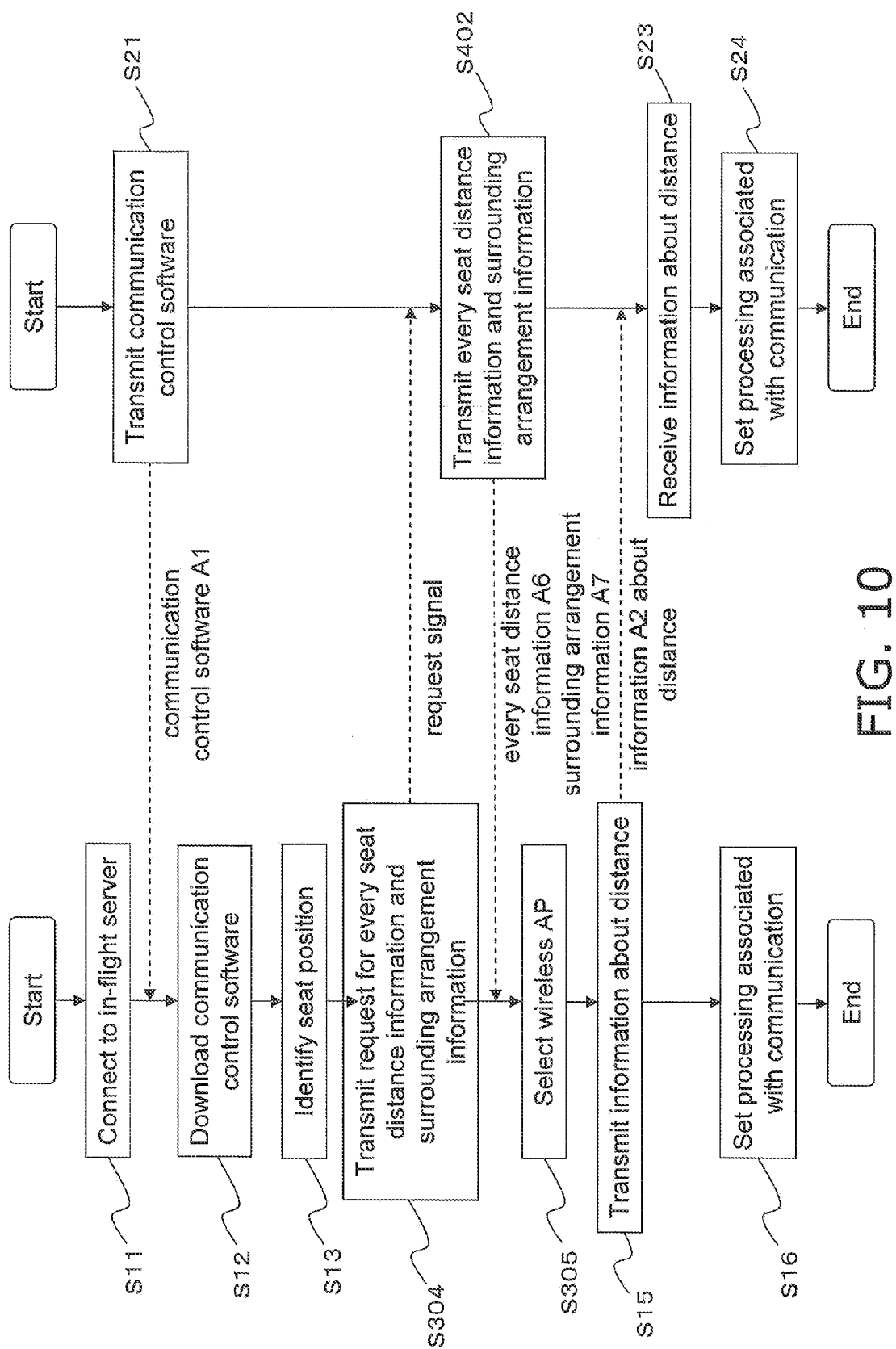
FIG. 10 is a flowchart showing the control of the wireless terminal and the wireless communication apparatus in the third embodiment.

In step S11 of FIG. 10, the user of the wireless terminal 101 entering the airplane 2 accesses the in-flight server 201 via an arbitrary wireless AP 202 with the communication unit 14, thus connecting the wireless terminal 101 to the in-flight server 201.

Subsequently, the user downloads communication control software A1 from the portal site stored in the in-flight server 201 into the wireless terminal 101 (S 12). More specifically, the wireless communication apparatus 210 transmits the communication control software A1 from the in-flight server 201 to the wireless terminal 101 in step S21. The wireless terminal 101 receives the communication control software A1 in step S12.

In step S13 (an example of a seat position identification step), the seat position of the user of the wireless terminal 101 is identified by the seat position identifying unit 11. The seat position is identified through manual input of the seat number into the wireless terminal 101 by the passenger.

In step S304, the wireless terminal 110 transmits a request signal for the every seat distance information A6 indicating the distance from each seat position to every wireless AP 202 (refer to FIG. 7) and the surrounding arrangement information A7 (refer to FIG. 9) stored in the in-flight server 201 to the wireless communication apparatus 210 via the wireless AP 202.

When receiving the request signal, the wireless communication controller 210 transmits the multiple-distance information A6 and the surrounding arrangement information A7 from the in-flight server 201 to the wireless terminal 1 in step S402.

In step S305, the wireless terminal 101 selects a wireless AP 202 to be set as the wireless AP used for communication. The operation in step S305 will be described in detail later.

In step S15 (an example of a distance determination step), the wireless terminal 101 transmits the information A2 about the distance from the selected wireless AP 202 to the identified seat position to the wireless communication controller 210. The information A2 includes information identifying the wireless AP 202 selected from the plurality of wireless APs 202 as the wireless AP used for communication, and information about the distance from the selected wireless AP 202 to the identified seat position A1.

In step S16, the processing setting unit 13 in the wireless terminal 101 sets the processing associated with communication in accordance with the distance from the selected wireless AP 202 to the identified seat position.

When receiving the information A2 about the distance from the selected wireless AP 202 to the identified seat position in step S24, the wireless communication apparatus 210 sets the processing associated with communication based on the received information. More specifically, as described above, the wireless communication apparatus 210 sets the PHY communication rate and the data size to be used in communication from the wireless AP 202 to the wireless terminal 101 and sets the selected wireless AP 202 used for reception and transmission from the wireless AP 202 to the wireless terminal 101.

The operation described above optimizes the communication settings between the wireless terminal 101 and the wireless communication apparatus 210.

The selection of the wireless AP 202 in step S305 performed by the selector 114 will now be described in detail.

Figure 11:
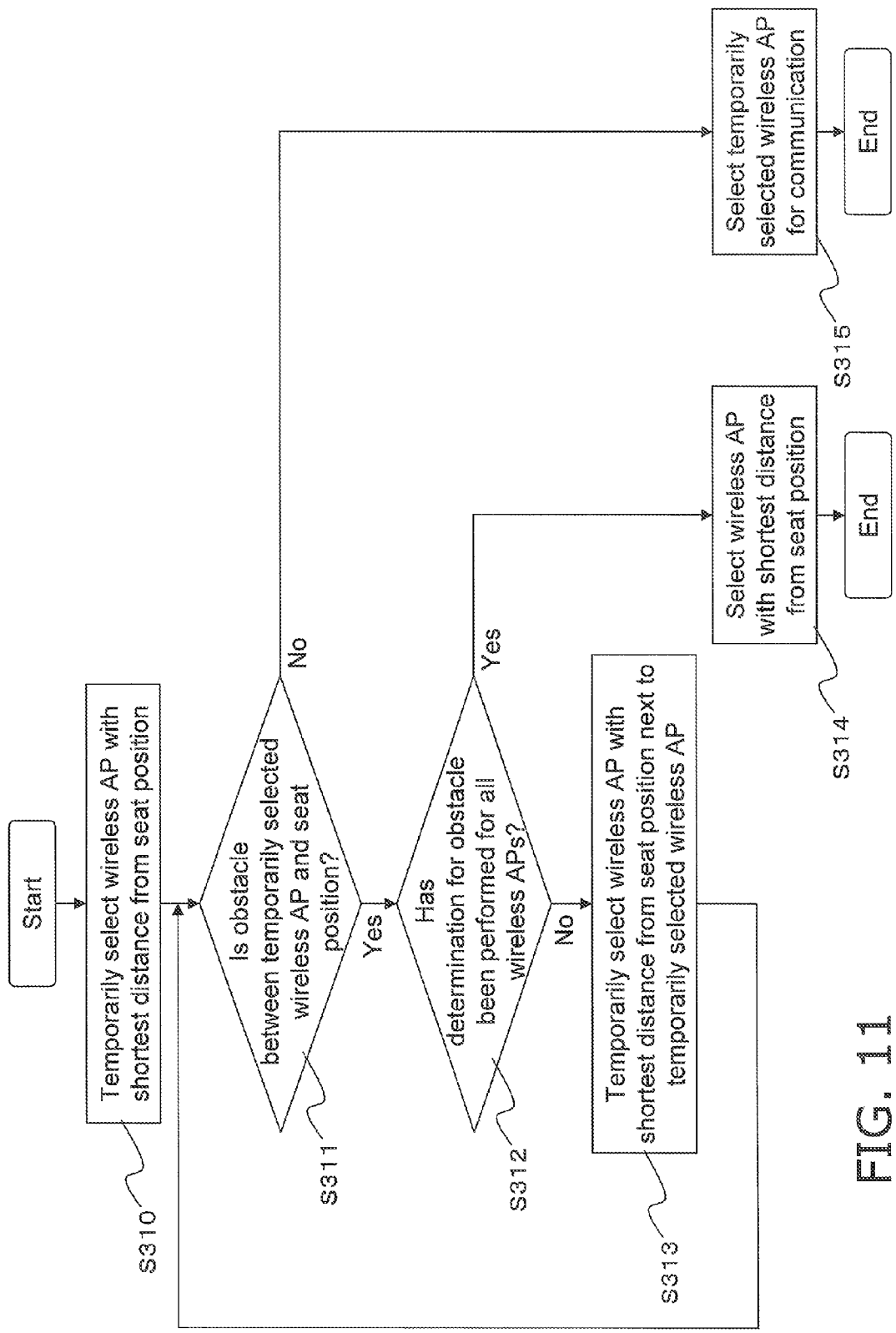
FIG. 11 is a flowchart showing the control for selecting a wireless AP in the third embodiment.

FIG. 11 is a flowchart showing the control for selecting the wireless AP 202.

As shown in FIG. 11, in step S310, the selector 114 temporarily selects the wireless AP with the shortest distance from the seat position based on the every seat distance information A6. When, for example, the user of the wireless terminal 101 is seated at the seat position A1 shown in FIG. 7, the wireless AP(2) 202 is selected first.

In step S311, the selector 114 determines whether any obstacle is present between the temporarily selected wireless AP 202 and the identified seat position A1 based on the surrounding arrangement information A7.

When determining that no obstacle is present, the selector 114 selects the wireless AP temporarily selected in S315, which is the wireless AP 202 with the shortest distance, as the wireless AP 202 used for communication.

When determining that an obstacle is present, the selector 114 determines whether the determination as to whether an obstacle is present has been performed for all the wireless APs 202 in step S312.

When the determination as to whether an obstacle is present has yet to be performed for all the wireless APs, the selector 114 temporarily selects the wireless AP with the second shortest distance from the seat position after the temporarily selected wireless AP 202 in step S313. In this manner, the wireless APs 202 are temporarily selected in the order of shorter distance from the seat position. For each temporarily selected wireless AP, the determination is performed as to whether an obstacle is present between the wireless AP and the seat position. When no obstacle is determined to be present between the wireless AP and the seat position, the wireless AP 202 is selected as the wireless AP 202 used for communication.

In the example shown in FIGS. 7 and 9, an obstacle (e.g., the wall 22 shown in FIG. 8) is present between the seat position A1 and the wireless AP(2). In step S313, the selector 114 thus temporarily selects the wireless AP(1) 202, which has the shortest distance from the seat position A1 next to the wireless AP(2) 202. An obstacle is present between the temporary selected wireless AP(1) 202 and the seat position A1. In this case, the wireless AP(3) with the shortest distance from the seat position next to the wireless AP(1) is selected temporarily. As shown in FIG. 9, no obstacle is present between the wireless AP(3) and the seat position A1. In this case, the wireless AP(3) 202 is selected as the wireless AP 202 used for communication.

When the determination as to whether an obstacle is present has been performed for all the wireless APs 202, and when an obstacle has been determined to be present for all the wireless APs 202, the wireless AP 202 having the shortest distance from the seat position is selected as the wireless terminal 202 used for communication in step S314.

3-3. Main Advantages (3-3-1) As described above, the wireless terminal 101 in the present embodiment communicates with the wireless communication apparatus 210 including the plurality of wireless APs 202. The wireless terminal 101 is used in the airplane 2 including the plurality of seats 21. The wireless terminal 101 includes the seat position identifying unit 11, the distance determination unit 112, and the processing setting unit 13 (an example of a terminal-side processing setting unit). The seat position identifying unit 11 identifies the seat position of the user of the wireless terminal 1. The distance determination unit 112 determines the distance from the identified seat position (an example of a seat position) to the corresponding wireless AP 202. The processing setting unit 13 sets the processing associated with communication based on the information about the determined distance.

This structure enables the processing associated with communication from the wireless AP 202 toward the wireless terminal 1 to be set in accordance with the distance from the wireless AP, and thus enables communication to be performed under more appropriate conditions.

(3-3-2) For the wireless terminal 101 in the present embodiment, the information about the distance includes information identifying the wireless AP 202 to be selected from the plurality of wireless APs 202 as the wireless AP 202 used for communication. The processing setting unit 13 sets the wireless AP 202 as the wireless AP used for communication.

This structure enables an appropriate wireless AP 202 to be selected from the plurality of wireless APs 202 as the wireless AP used for communication with the wireless terminal 1 even if the plurality of wireless APs 202 are arranged, and thus enables more appropriate communication.

(3-3-3) In the wireless terminal 101 of the present embodiment, the distance determination unit 112 determines the distance from the identified seat position to the wireless AP 202 to be selected as the wireless AP used for communication. The distance determination unit 112 includes the multiple-distance determination unit 113 and the selector 114. The multiple-distance determination unit 113 determines the distance from the seat position to each of the plurality of wireless APs 202. The selector 114 selects the wireless AP 202 to be set as the wireless AP used for communication based on the information about the determined distance and the surrounding arrangement information for the identified seat position.

This structure enables one of the plurality of wireless APs 202 to be selected and set as the wireless AP 202 used for communication based on the distance from the seat position and the surrounding arrangement of obstacles when the plurality of wireless APs 202 are arranged, and thus enables communication to be performed under more appropriate conditions.

Fourth Embodiment

A wireless terminal, a wireless communication controller, and a wireless communication system according to a fourth embodiment of the disclosure will now be described with reference to FIGS. 6, 7, 9, and 12. The wireless terminal, the wireless communication controller, and the wireless communication system of the fourth embodiment differ from the wireless terminal, the wireless communication controller, and the wireless communication system in the third embodiment in the operation for selecting the wireless AP 202 to be set. The present embodiment will thus be described focusing on the operation for selecting the wireless AP, and the structures of the present embodiment, which are the same as described in the third embodiment, will not be described.

4-1. Operation

Figure 12:
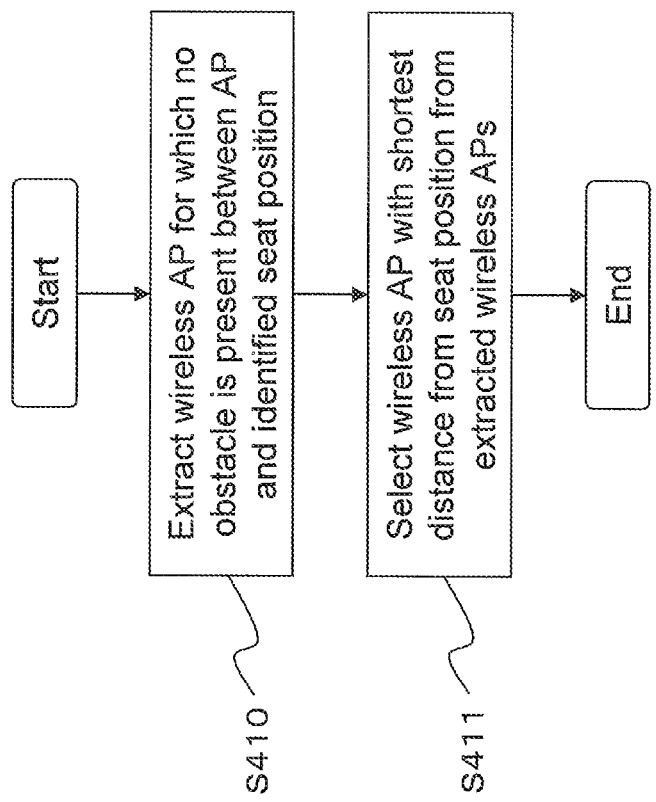
FIG. 12 is a flowchart showing the control for selecting a wireless AP in the third embodiment.

FIG. 12 is a flowchart showing the operation for selecting the wireless AP 202 for the wireless terminal 101 in the fourth embodiment.

As shown in FIG. 12, in step S410, the wireless AP 202 for which no obstacle is present between the wireless AP and the identified seat position is extracted. For the seat position A1 shown in FIGS. 7 and 9, for example, the wireless AP(3) 202 and the wireless AP(4) 202 are extracted from the wireless AP(1) to the wireless AP(5) 202.

In step S411, the wireless AP 202 with the shortest distance from the identified seat position is selected from the extracted wireless APs 202. For the seat position A1 shown in FIGS. 7 and 9, the distance from the extracted wireless AP(3) 202 to the seat position A1 is 10 m, whereas the distance from the extracted wireless AP(4) 202 to the seat position A1 is 15 m. In this case, the wireless AP(3) 202 is selected.

The wireless terminal 1 and the wireless communication controller set the processing associated with communication in accordance with information about the distance from the selected wireless AP(3) to the seat position A1.

Fifth Embodiment

A wireless terminal, a wireless communication controller, and a wireless communication system according to a fifth embodiment of the disclosure will now be described with reference to FIGS. 13 and 14. In the fifth embodiment, the wireless communication controller selects the wireless AP 202, which is selected by the wireless terminal in the third embodiment. The wireless communication controller according to the fifth embodiment differs from the controller in the second embodiment in the structure and the operation for selecting the wireless AP to be set. The components of the fifth embodiment that are the same as described in the first to fourth embodiments may not be described.

5-1. Structure 5-1-1. IFE System 40

Figure 13:
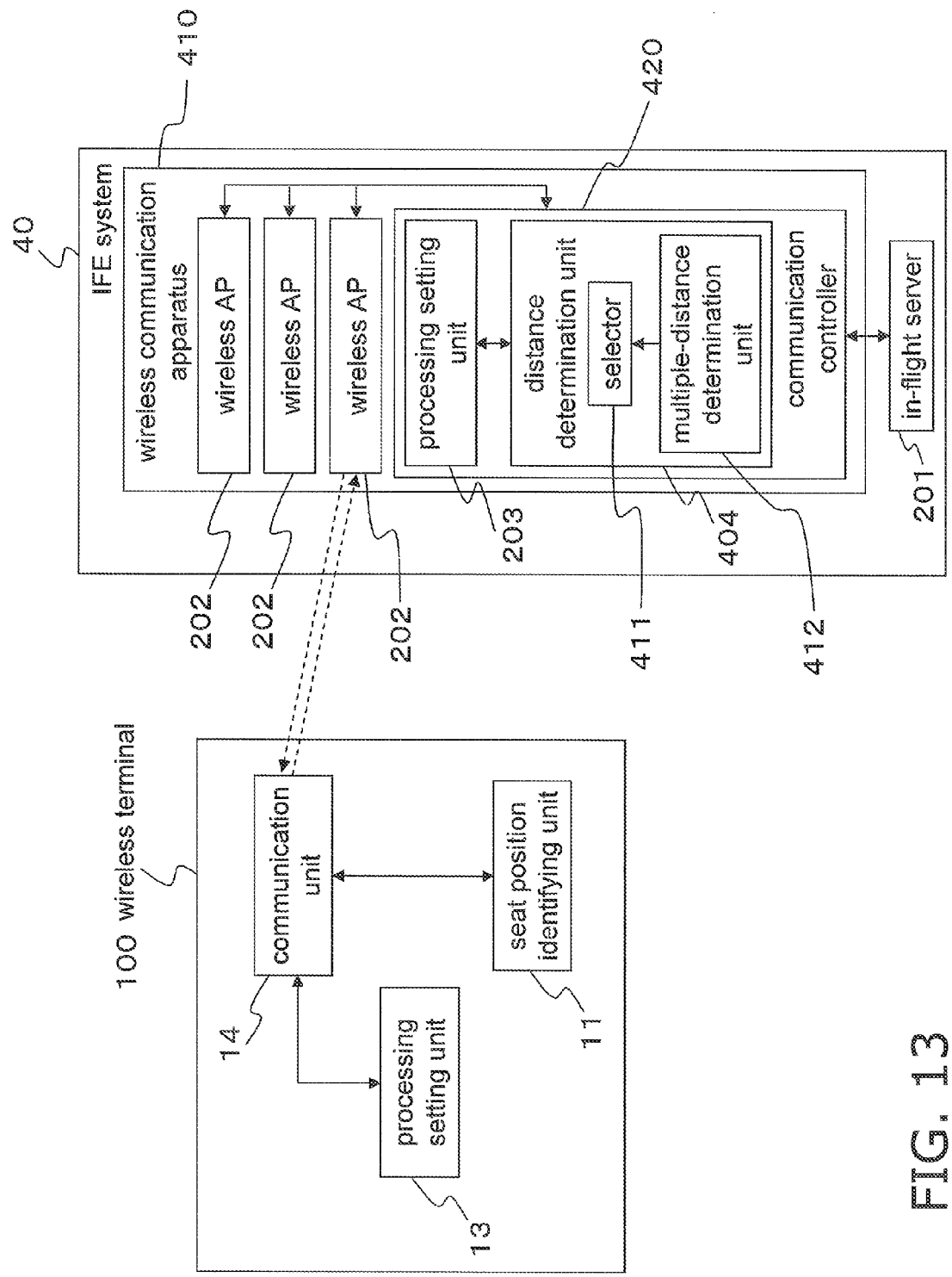
FIG. 13 is a block diagram of a wireless terminal and an IFE system in a fourth embodiment.

FIG. 13 shows the structure of the wireless terminal 100 and the IFE system 40 according to the fifth embodiment.

As shown in FIG. 13, the IFE system 40 according to the present embodiment includes a wireless communication apparatus 410 and an in-flight server 201. The wireless communication apparatus 410 includes a plurality of wireless APs 202 and a communication controller 420. Unlike the IFE system 30 of the second embodiment, the IFE system 40 according to the present embodiment includes a distance determination unit 420, which includes a multiple-distance determination unit 412 and a selector 411.

The multiple-distance determination unit 412 determines the distance from each of the plurality of wireless APs 202 installed in the airplane 2 to the seat position. The in-flight server 201 stores every seat distance information A6 (refer to FIG. 7) indicating the distance from each seat position to every wireless AP 202. The multiple-distance determination unit 412 determines the distance from the current seat position to each wireless AP 202 based on the every seat distance information A6. The selector 114 selects the wireless AP 202 to be set as the wireless AP used for communication in accordance with the information about the distance from the identified seat position to each wireless AP, which is obtained by the multiple-distance determination unit 113, and the surrounding arrangement information (refer to FIG. 9) for the identified seat position.

5-1-2. Wireless Terminal 100

The wireless terminal 100 according to the present embodiment is the same as described in the second embodiment, and will not be described.

5-2. Operation

An example of a method for controlling wireless communication according to the present embodiment will now be described.

Figure 14:
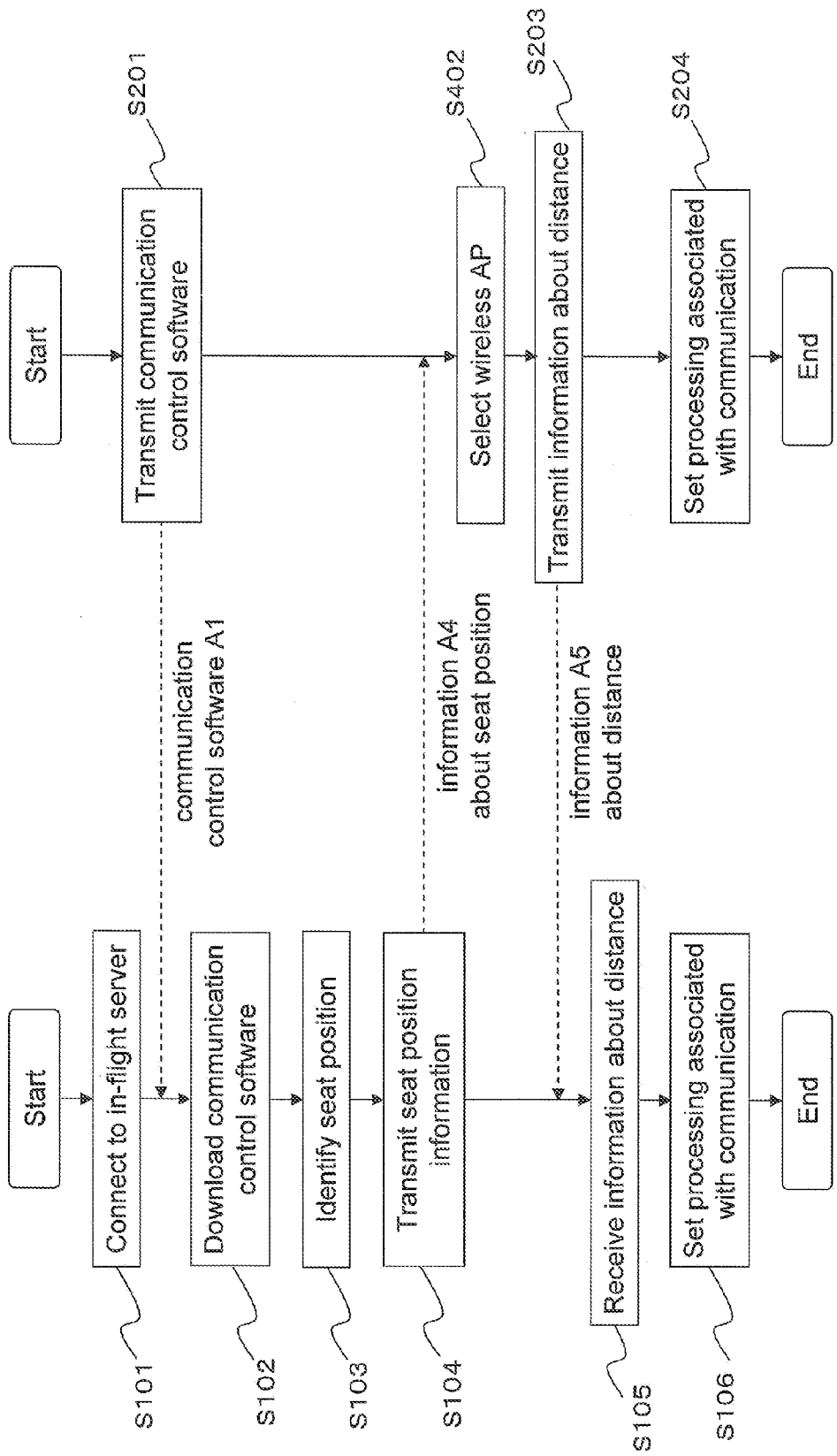
FIG. 14 is a flowchart showing the control of the wireless terminal and the wireless communication apparatus in the fourth embodiment.

FIG. 14 is a flowchart showing the control of the operation performed by the wireless terminal 100 and the wireless communication apparatus 410 in the airplane 2. Steps S101 to S106 indicate a control process performed by the wireless terminal 100. Steps S201, S402, S203, and S204 indicate a control process performed by the wireless communication apparatus 410.

The control according to the present embodiment includes step S402, which replaces step S202 in the second embodiment. More specifically, in step S104 (an example of a distance determination step), the wireless terminal 1 transmits information A4 about the identified seat position to the wireless AP 202 with the communication unit 14.

When the wireless communication apparatus 310 receives the information about the identified seat position, the distance determination unit 404 selects the wireless AP 202 to be set as the wireless AP 202 used for communication based on the every seat distance information A6 and the surrounding arrangement information A7 stored in the in-flight server 201 through the same processing as shown in FIG. 11.

In step S203, the wireless communication apparatus 310 transmits the information A5 about the distance, which includes information about the distance from the selected wireless AP 202 to the seat position and information identifying the selected wireless AP.

The wireless terminal 100 and the wireless communication apparatus 410 set the processing associated with communication in accordance with the distance from the selected wireless AP 202 to the seat position (S307, S404).

In the present embodiment, the wireless AP 202 may be selected through the processing shown in FIG. 12, which is described in the fourth embodiment.

5-3 Main Advantages (5-3-1) The wireless terminal 100 of the present embodiment communicates with the wireless communication apparatus 410 including the plurality of wireless APs 202. The wireless terminal 100 is used in the airplane 2 including the plurality of seats 21. The wireless terminal 100 includes the seat position identifying unit 11, the communication unit 14, and the processing setting unit 13. The seat position identifying unit 11 identifies the position of the seat 21 of the user of the wireless terminal 100. The communication unit 14 transmits information about the identified seat position to the wireless communication apparatus 410, and receives information about the distance from the wireless terminal 100, which is identified based on the information about the seat position, to the wireless AP 202. The processing setting unit 13 sets the processing associated with communication based on the information about the distance.

This structure enables the information about the distance from the wireless AP 202 to the corresponding wireless terminal 100 to be received from the wireless communication apparatus 310, and enables the processing associated with communication from the wireless AP 202 toward the wireless terminal 100 to be set in accordance with the distance, and thus enables communication to be performed under more appropriate conditions.

(5-3-2) In the present embodiment, the communication controller 420 (an example of a wireless communication controller) is a wireless communication controller that controls communication with the wireless terminal 100, which is used in the airplane 2 including the plurality of seats 21, via the wireless AP 202. The communication controller 420 includes the distance determination unit 404. The distance determination unit 404 determines the distance from the wireless terminal 100 to the corresponding wireless AP 202 in accordance with the information about the seat position of the user of the wireless terminal 100 transmitted from the wireless terminal 100. The communication controller 420 transmits the information about the determined distance to the wireless terminal 100 via the wireless AP 202.

This structure enables the information about the distance from the wireless AP 202 to the wireless terminal 100 to be transmitted to the wireless terminal 100, and enables the wireless terminal 100 to set the processing associated with communication from the wireless terminal 100 toward the wireless AP 202 in accordance with the distance, and thus enables communication to be performed under more appropriate conditions.

(5-3-3) In the communication controller 420 according to the present embodiment, the information about the distance includes information identifying the wireless AP 202 to be selected from the plurality of wireless APs 202 as the wireless AP used for communication. The processing setting unit 203 sets the selected wireless AP 202 as the wireless AP used for communication.

This structure enables an appropriate wireless AP 202 to be selected from the plurality of wireless APs 202 as the wireless terminal 100 used for communication even if the plurality of wireless APs 202 are arranged, and thus enables more appropriate communication.

(5-3-4) In the communication controller 420 according to the present embodiment, the distance determination unit 420 determines the distance from the identified seat position to the wireless AP 202 to be set as the wireless AP used for communication. The distance determination unit 420 includes the multiple-distance determination unit 412 and the selector 411. The multiple-distance determination unit 412 identifies the distance from the seat position to each of the plurality of wireless APs 202. The selector 411 selects the wireless AP 202 to be set as the wireless AP 202 used for communication based on the information about the determined distance and the surrounding arrangement information for the identified seat position.

This structure enables one of the plurality of wireless APs 202 to be selected and set as the wireless AP 202 used for communication based on the distance to the seat position and the surrounding arrangement of obstacles when the plurality of wireless APs 202 are arranged, and enables communication to be performed under more appropriate conditions.

Other Embodiments

Although the disclosure has been described based on the embodiments, the disclosure should not be limited to the above embodiments, and may be modified without departing from the spirit and scope of the disclosure.

(A) Although the third, fourth, and fifth embodiments describe the case in which the wireless AP 202 is selected based on the distance from the identified seat position to each of the plurality of wireless APs 202 and the surrounding arrangement information, the wireless AP may be selected based solely on the distance from the identified seat position to each of the plurality of wireless APs 202. In this case, the wireless AP 202 nearest to the identified seat position is selected.

(B) The wireless terminal 1 according to the first embodiment transmits a request for the information A10 about the set wireless AP in step S14 and then receives the information A10. Alternatively, the wireless terminal 1 may receive the information A10 together with the communication control software A1 when downloading the communication control software A1 in step S12.

In the third and fourth embodiments, a request for the every seat distance information A6 and the surrounding arrangement information A7 is transmitted in step S304 and then the every seat distance information A6 and the surrounding arrangement information A7 are received. Alternatively, such information may be received together with the communication control software A1 when the communication control software A1 is downloaded in step S302.

(C) In the above embodiment, the wireless terminal 1 and the wireless terminals 100 and 101 each include the processing setting unit 13 (an example of a terminal-side processing setting unit), but may not include the processing setting unit 13.

In the communication between the wireless terminals 1, 100, and 101 and the wireless communication apparatuses 210, 310, and 410, large moving image data, such as AV content, is transmitted from the wireless communication apparatuses 210, 310, and 410. The structures without the processing setting unit 13 can set the communication rate and the data size to be used in transmission from the wireless communication apparatuses 310, 310, and 410 to the wireless terminals 1, 100, and 101 in accordance with the distance, and thus effectively stabilize the state of communication.

(D) In the above embodiments, the wireless terminals 1 and 101 transmit the information A2 about the distance to the wireless communication apparatus 210. The processing setting unit 203 then performs settings associated with communication of the wireless communication apparatus 210. The wireless terminal 100 transmits the information A4 about the position to the wireless communication apparatuses 310 and 410. The processing setting unit 203 performs settings associated with communication of the wireless communication apparatuses 310 and 410. Alternatively, the settings associated with communication of the wireless communication apparatuses 210, 310, and 410 may not be performed.

In this case, the above structures at least enable communication from the wireless terminals 1, 100, and 101 toward the wireless communication apparatuses 210, 310, and 410 to be set in accordance with the distance from the wireless AP 202, and thus enable more appropriate communication than conventional structures.

The communication from the wireless communication apparatuses 210, 310, and 410 to the wireless terminals 1, 100, and 101 use a larger amount of data than the communication from the wireless terminals 1, 100, and 101 to the wireless communication apparatuses 210, 310, and 410. To stabilize the state of communication, it is more preferable to set the processing associated with communication from the wireless communication apparatuses 210, 310, and 410 toward the wireless terminal 1 in accordance with the distance than to set the processing associated with communication from the wireless terminals 1, 100, and 101 toward the wireless communication apparatus 310 in accordance with the distance.

(E) In the above embodiments, the seat position is manually input into the seat position identifying unit 11. Alternatively, the wireless terminal 1 may read identification information attached to the seat 21 such as a barcode or a two-dimensional code indicating the seat number by using its camera function, and identify the seat position. It may be adopted a composition that the seat position is identified by communicating with the wireless terminal 1 by using a communication unit installed on the seat 21. The communication unit may use, for example, near field communication (NFC), a wireless tag, or infrared communication.

(F) The above embodiments describe the case in which the user of the wireless terminals 1, 100, and 101 entering the airplane accesses the in-flight server 201 and downloads the communication control software A1 and A3. It is only required that the wireless terminals 1 and 100 can download the communication control software A1 and A3. For example, the user may download the software in advance from an external server before entering the airplane. Alternatively, a card storing the software may be distributed to the user. Further, the communication control software A1 and A3 may be preset in the wireless terminal 1 and provided to the user. This enables the software to be used without the burden of downloading the software.

(G) Although the above embodiments describe the case in which the airplane 2 includes the plurality of wireless APs 202, the airplane 2 may include a single wireless AP 202. In this case, the selection of the wireless AP 202 is eliminated. Thus, the distance determination units 12 and 204 include the table storing information about the distance from only the single wireless AP 202.

(H) In the above embodiments, the processing associated with communication between the wireless terminal and the wireless communication apparatus includes setting the data transfer rate, the data size, and the AGC initial value, and selecting the wireless AP. Only one of these settings may be performed.

(I) Although the above embodiments describe the case in which the wireless terminal is a tablet personal computer (PC), the wireless terminal may not be a tablet PC but may be, for example, a mobile telephone such as a smartphone.

(J) Although the above embodiments describe the case in which the facility is the airplane 2 and the seat position of the user is the position of the seat 21 in the airplane 2, the facility should not be limited to an airplane and the seat position should not be limited to a seat position in an airplane. The seat position may be, for example, the position of a seat in a moving object, such as a bus or a ship, or may be a seat in a facility, such as a classroom or a hall. The position may not be the position of a seat, but may be the position of any other place. It is only required that the position of the user can be identified.

(K) All or part of the operational processes of the wireless communication control method according to each of the above embodiments may be implemented by using a program. All or part of the operational processes performed by the terminal according to each of the above embodiments may be implemented by a central processing unit (CPU) of a computer. The program operates in cooperation with the computer.

The program may be recorded onto a computer readable storage medium such as a read-only memory (ROM), or may be transferred via a transfer medium such as the Internet, or via a transfer medium such as light or radio waves, and may be read by a computer. For example, the wireless terminal 1 according to each of the above embodiments may be connected to the Internet wirelessly or with wires, and the program implementing the above operations may be transferred via the Internet. The computer should not be limited to hardware such as a CPU, but may be firmware or an operating system (OS). All or part of the processes, procedures, and steps implemented by the information reading method according to each of the above embodiments may be implemented by using either hardware or software, or may be implemented by using both software and hardware.

The wireless terminal, the wireless communication system, and the wireless communication controller of the disclosure enable communication to be performed under more appropriate conditions. The disclosure is widely applicable to, for example, a tablet wireless terminal and a wireless communication system including a wireless terminal and an IFE system in an airplane.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms "including," "having," and their derivatives. Further, the terms "part," "section," "portion," "member," and "element" used in singular form may cover not only singular but also plural.

The term "configured" used to describe components, parts, and portions of an apparatus is intended to mean that the apparatus is configured to achieve an intended function, and/or is intended to cover programmed hardware and/or software.

The terms of degree such as "substantially," "about," and "approximately" as used herein are intended to mean a reasonable amount of deviation of the modified term such that the end result is not significantly changed.

While particular embodiments of the present invention have been indicated and described, it would be obvious to those skilled in the art that various other changes and modifications can be made without departing from the spirit and scope of the invention. For example, the size, shape, positions or orientations of the components can be modified as necessary and/or as intended. The components that are indicated as directly connected or in contact with each other may have other materials or components interposed between them. The functions of a single element may be implemented by a plurality of elements, or the functions of a plurality of elements may be implemented by a single element. The structure and functions of one embodiment may be applied to other embodiments. A specific embodiment may not produce all the advantages at the same time.

What is claimed is:

1. A wireless terminal that communicates with a wireless communication apparatus including one or more wireless access points, the wireless terminal being used in a facility including a plurality of seats, the wireless terminal comprising:
   a seat position identifying unit configured to identify a seat position of a user of the wireless terminal;
   a distance determination unit configured to determine a distance from the identified seat position to the one or more wireless access points; and
   a terminal-side processing setting unit configured to set processing associated with communication based on information about the determined distance.

2. The wireless terminal according to claim 1, wherein
   the terminal-side processing setting unit sets at least one of a data communication rate, a data size, and an initial value of automatic gain control to be used in communication from the wireless terminal to the one or more wireless access points.

3. The wireless terminal according to claim 1, wherein the information about the distance includes information indicating a wireless access point to be selected from the wireless access points and set as a wireless access point used for communication, and
   the terminal-side processing setting unit sets the selected wireless access point as the wireless access point used for communication.

4. The wireless terminal according to claim 3, wherein the distance determination unit determines a distance from the identified seat position to the wireless access point to be set as the wireless access point used for communication, and
the distance determination unit includes
a multiple-distance determination unit configured to determine a distance from the seat position to each of the wireless access points, and
a selector configured to select, as the wireless access point used for communication, the wireless access point with the shortest distance from the seat position based on information about the determined distance from the seat position to each wireless access point.

5. The wireless terminal according to claim 3, wherein
the distance determination unit determines a distance from the identified seat position to the wireless access point to be set as the wireless access point used for communication, and
the distance determination unit includes
a multiple-distance determination unit configured to determine a distance from the seat position to each of the wireless access points, and
a selector configured to select the wireless access point to be set as the wireless access point used for communication based on information about the determined distance from the seat position to each access point and surrounding arrangement information for the identified seat position.

6. A wireless terminal that communicates with a wireless communication apparatus including one or more wireless access points, the wireless terminal being used in a facility including a plurality of seats, the wireless terminal comprising:
a seat position identifying unit configured to identify a seat position of a user of the wireless terminal;
a distance determination unit configured to determine a distance from the identified seat position to the one or more wireless access points; and
a transmission unit configured to transmit information about the determined distance to the one or more wireless access points to set processing associated with communication.

7. The wireless terminal according to claim 6, wherein the processing associated with communication includes setting at least one of a data communication rate and a data size to be used in communication from the one or more wireless access points to the wireless terminal.

8. The wireless terminal according to claim 6, wherein the processing associated with communication includes setting a wireless access point selected from the wireless access points as a wireless access point used for communication.

9. A wireless communication system, comprising:
the wireless terminal according to claim 6; and
a wireless communication apparatus,
wherein the wireless communication apparatus includes a wireless access point configured to communicate with the wireless terminal, and a processing setting unit configured to set processing associated with communication based on the information about the distance that is transmitted from the wireless terminal.

10. A wireless terminal that communicates with a wireless communication apparatus including one or more wireless access points, the wireless terminal being used in a facility including a plurality of seats, the wireless terminal comprising:
a seat position identifying unit configured to identify a seat position of a user of the wireless terminal;
a communication unit configured to transmit information about the identified seat position to the wireless communication apparatus, and receive information about a distance from the wireless terminal to the one or more wireless access points determined based on information about the seat position; and
a terminal-side processing setting unit configured to set processing associated with communication based on information about the distance.

11. A wireless communication system, comprising:
the wireless terminal according to claim 10; and
a wireless communication apparatus,
wherein the wireless communication apparatus includes a wireless access point configured to communicate with the wireless terminal, and a distance determination unit configured to determine a distance to the wireless access point based on the information about the seat position that is transmitted from the wireless terminal, and
the wireless communication apparatus transmits the information about the determined distance to the wireless terminal via the wireless access point.

12. A wireless terminal that communicates with a wireless communication apparatus including one or more wireless access points, the wireless terminal being used in a facility including a plurality of seats, the wireless terminal comprising:
a seat position identifying unit configured to identify a seat position of a user of the wireless terminal; and
a transmission unit configured to transmit information about the identified seat position to the one or more wireless access points to set processing associated with communication.

13. The wireless terminal according to claim 12, wherein the processing associated with communication includes setting at least one of a data communication rate and a data size to be used in communication from the one or more wireless access points to the wireless terminal.

14. The wireless terminal according to claim 12, wherein the processing associated with communication includes setting a wireless access point selected from the wireless access points as a wireless access point used for communication.

15. A wireless communication system, comprising:
the wireless terminal according to claim 12; and
a wireless communication apparatus,
wherein the wireless communication apparatus includes a wireless access point configured to communicate with the wireless terminal, a distance determination unit configured to determine a distance to the wireless access point based on the information about the seat position that is transmitted from the wireless terminal, and a processing setting unit configured to set processing associated with communication based on the determined distance.

16. A wireless communication controller that controls communication with a wireless terminal via a wireless access point, the wireless terminal being used in a facility including a plurality of seats, the controller comprising:
a distance determination unit configured to determine a distance from the wireless terminal to the wireless access point based on information about a seat position of a user of the wireless terminal that is transmitted from the wireless terminal; and
a processing setting unit configured to set processing associated with communication based on information about the determined distance.

17. The wireless communication controller according to claim 16, wherein the processing setting unit sets at least one of a data communication rate and a data size to be used in communication from the wireless access point to the wireless terminal.

18. The wireless communication controller according to claim 16, wherein the information about the distance includes information indicating a wireless access point to be selected from a plurality of the wireless access points as a wireless access point used for communication, and the processing setting unit sets the selected wireless access point as the wireless access point used for communication with the wireless terminal.

19. The wireless communication controller according to claim 18, wherein the distance determination unit determines the distance from the identified seat position to the wireless access point to be set as the wireless access point used for communication, and the wireless communication controller includes a multiple-distance determination unit configured to determine a distance from the seat position to each of the wireless access points, and a selector configured to select, as the wireless access point used for communication, the wireless access point with the shortest distance from the seat position based on information about the determined distance from the seat position to each access point.

20. The wireless communication controller according to claim 18, wherein the distance determination unit determines a distance from the identified seat position to the wireless access point to be set as the wireless access point used for communication, and the distance determination unit includes a multiple-distance determination unit configured to determine a distance from the seat position to each of the wireless access points, and a selector configured to select the wireless access point to be set as the wireless access point used for communication based on information about the determined distance from the seat position to each access point and surrounding arrangement information for the identified seat position.

* * * * *